(12) United States Patent
Hirata et al.

(10) Patent No.: US 7,440,238 B2
(45) Date of Patent: Oct. 21, 2008

(54) THIN FILM MAGNETIC HEAD, METHOD OF MANUFACTURING THE SAME, AND MAGNETIC RECORDING APPARATUS

(75) Inventors: Kei Hirata, Tokyo (JP); Kiyoshi Noguchi, Tokyo (JP); Atsushi Yamaguchi, Tokyo (JP)

(73) Assignee: TDK Corporation, Tokyo (JP)

( * ) Notice: Subject to any disclaimer, the term of this patent is extended or adjusted under 35 U.S.C. 154(b) by 380 days.

(21) Appl. No.: 11/410,043

(22) Filed: Apr. 25, 2006

(65) Prior Publication Data

US 2006/0262454 A1    Nov. 23, 2006

(30) Foreign Application Priority Data

Apr. 27, 2005    (JP)    ............... 2005-129782

(51) Int. Cl.
*G11B 5/127*    (2006.01)
(52) U.S. Cl. .................... 360/317; 29/603.16
(58) Field of Classification Search ............... 360/317, 360/324.1; 365/171; 29/603.16
See application file for complete search history.

(56) References Cited

U.S. PATENT DOCUMENTS

| | | | |
|---|---|---|---|
| 7,360,299 B2* | 4/2008 | Carey et al. ............... | 29/603.16 |
| 7,363,699 B2* | 4/2008 | Carey et al. ............... | 29/603.16 |
| 2004/0165318 A1* | 8/2004 | Sakaki et al. ............... | 360/317 |
| 2005/0003234 A1 | 1/2005 | Ikeda et al. | |
| 2005/0162784 A1* | 7/2005 | Shiraki et al. ............... | 360/317 |
| 2006/0007602 A1* | 1/2006 | Han et al. ............... | 360/317 |
| 2006/0152969 A1* | 7/2006 | Trouilloud ............... | 365/171 |
| 2008/0062581 A1* | 3/2008 | Parkin ............... | 360/324.11 |

FOREIGN PATENT DOCUMENTS

| | | |
|---|---|---|
| JP | A-11-154609 | 6/1999 |
| JP | A-2000-315302 | 11/2000 |
| JP | A-2003-6813 | 1/2003 |
| JP | A 2005-25890 | 1/2005 |

OTHER PUBLICATIONS

S. Ikeda et al. "Soft Magnetic Materials with High $B_5$ for High-Performance Writers." *Journal of Magnetic Society of Japan*, vol. 28, No. 9, pp. 963-968, 2004.

* cited by examiner

*Primary Examiner*—Tianjie Chen
(74) *Attorney, Agent, or Firm*—Oliff & Berridge, PLC

(57) ABSTRACT

The present invention provides a thin film magnetic head capable of satisfying both assurance of recording performance and assurance of reproduction performance. In the case where a lower magnetic layer is formed of an iron cobalt alloy (for example, $Fe_{65}Co_{35}$) which contains iron in a range of 60 at % to 80 at % and has extremely high saturation magnetic flux density of 2.4 T or higher, a head isolation layer formed of ruthenium (Ru) is provided between the lower magnetic layer and an upper read shield layer portion. As compared with the case where the head isolation layer is not provided between the lower magnetic layer and the upper read shield layer portion, the strength of a recording magnetic field increases and a reproduction output of an MR element is stabilized.

8 Claims, 17 Drawing Sheets

THIN FILM MAGNETIC HEAD, METHOD OF MANUFACTURING THE SAME, AND MAGNETIC RECORDING APPARATUS

BACKGROUND OF THE INVENTION

1. Field of the Invention

The present invention relates to a thin film magnetic head having at least an inductive magnetic transducer for recording, a method of manufacturing the same, and a magnetic recording apparatus on which the thin film magnetic head is mounted 2. Description of the Related Art In recent years, in association with improvement in areal density of a magnetic recording medium (hereinbelow, simply called "recording medium") such as a hard disk, improvement in performance of a thin film magnetic head to be mounted on a magnetic recording apparatus such as a hard disk drive is demanded. There is a widely used thin film magnetic head, in general, having a reproduction head portion which includes a magneto-resistive (MR) effect element as a magnetic transducer for reproducing and a recording head portion which includes an inductive magnetic transducer for recording, and having a structure in which the reproduction head portion and the recording head portion are stacked. A thin film magnetic head of this kind is called a "composite thin film magnetic head".

The reproduction head portion having a magnetic reproduction function in the composite thin film magnetic head includes, mainly, an MR element, a lower read shield layer and an upper read shield layer which are disposed so as to face each other by sandwiching the MR element. On the other hand, the recording head portion having a magnetic recording function mainly includes: a lower magnetic layer and an upper magnetic layer which face each other via a recording gap layer on the side close to a recording medium facing surface (air bearing surface) that faces a recording medium and are magnetically coupled to each other through a back gap on the side far from the air bearing surface, thereby forming a ring-shaped magnetic path as a whole; and a thin film coil which spirally winds so as to pass through a space surrounded by the lower and upper magnetic layers and generates a magnetic flux for recording. Particularly, the lower magnetic layer, the recording gap layer and the upper magnetic layer have the same width on the side close to the air bearing surface and form a so-called trim structure.

In the composite thin film magnetic head, when a magnetic flux for recording generated by the thin film coil is received by the upper and lower magnetic layers, a magnetic field for recording (recording magnetic field) is generated on the basis of the magnetic flux leaked near the recording gap layer. Therefore, a recording medium is magnetized along its surface by the recording magnetic field. As a result, information is magnetically recorded onto the recording medium. The ring-shaped magnetic path structure formed by the upper and lower magnetic layers is called a "ring head" and a recording method in which the recording medium is magnetized along its surface by using the ring head is called a "longitudinal recording method". On the other hand, the magnetic path structure which extends in a direction orthogonal to the recording medium is called a "single-magnetic-pole head" and a recording method in which the recording medium is magnetized in a direction orthogonal to its surface by using the single-magnetic-pole head is called a "perpendicular recording method".

In processes of developing a thin film magnetic head, in order to improve recording performance, various techniques have already been proposed with respect to the configuration of the thin film magnetic head.

Concretely, with respect to the configuration of a thin film magnetic head in the perpendicular recording method, there is a known technique of constructing a single-magnetic-pole head so as to have a stacked structure in which a nonmagnetic layer formed of a specific nonmagnetic metal and a magnetic layer formed of iron (Fe) and cobalt (Co) are stacked in order to prevent recorded data from being unintentionally erased by a leaked magnetic field (for example, refer to Japanese Patent Laid-open No. 2005-025890).

There is also a known technique in which ruthenium (Ru) is deposited as a base layer and, after that, iron cobalt alloy ($Fe_{70}CO_{30}$) as a soft magnetic material is deposited on the base layer to improve soft magnetic properties of the magnetic materials applied to the thin film magnetic head (refer to, for example, Non-Patent Document 1: Journal of The Magnetics Society of Japan, Vol. 28, No. 9, pp. 963 to 968, 2004.

SUMMARY OF THE INVENTION

To increase the strength of a recording magnetic field for the purpose of improving the recording performance of a composite thin film magnetic head of the longitudinal recording method, it is sufficient to use a magnetic material having high saturation magnetic flux density as the material of a lower magnetic layer. More concretely, to increase the strength of the recording magnetic field as much as possible, it is sufficient to use an iron cobalt alloy (FeCo) having extremely high saturation magnetic flux density of 2.4 T (tesla) or higher as the material of the lower magnetic layer.

However, in the conventional composite thin film magnetic head of the longitudinal recording method, when the lower magnetic layer is formed by using an iron cobalt alloy having extremely high saturation magnetic flux density of 2.4 T or higher, the strength of the recording magnetic field increases by using the excellent magnetic properties of the iron cobalt alloy, so that the recording performance improves. On the other hand, due to the magnetic properties of the iron cobalt alloy, the reproduction performance deteriorates. More concretely, when the saturation magnetic flux density of the magnetic material of the lower magnetic layer increases to 2.4 T, an MR element becomes susceptible to magnetic noise during operation of the thin film magnetic head, so that a reproduction output of the MR element tends to fluctuate. In the conventional composite thin film magnetic head of the longitudinal recording method, assurance of the recording performance accompanying increase in the strength of the recording magnetic field and assurance of the reproduction performance accompanying stabilization of a reproduction output of the MR element have the relation of a tradeoff. The conventional composite thin film magnetic head has a drawback that it is difficult to satisfy both assurance of recording performance and assurance of reproduction performance.

It is desirable to provide a thin film magnetic head and a magnetic recording apparatus realizing both assurance of recording performance and assurance of reproduction performance.

It is also desirable to provide a thin film magnetic head manufacturing method capable of manufacturing a thin film magnetic head realizing both assurance of recording performance and assurance of reproduction performance.

A thin film magnetic head of an embodiment of the invention includes: a first magnetic pole and a second magnetic pole which are adjacent to a gap layer, face each other, and generate a magnetic field for magnetizing a recording medium along the surface of the recording medium; a magnetic shield layer for magnetically shielding a magnetic transducer for converting a magnetic signal to an electric signal from the periphery; and a magnetic isolation layer disposed between the first magnetic pole and the magnetic shield layer so as to be adjacent to the first magnetic pole and the magnetic shield layer, and magnetically isolating between the first pole and the magnetic shield layer. The first magnetic pole is made of an iron cobalt alloy (FeCo) containing iron (Fe) in a range of 60 at % to 80 at % and having saturation magnetic flux density of 2.4 T (tesla) or higher, and the magnetic isolation layer is made of ruthenium (Ru).

A method of manufacturing a thin film magnetic head that generates a magnetic field for magnetizing a recording medium along the surface of the recording medium according to an embodiment of the invention includes: a first step of forming a magnetic shield layer so as to magnetically shield a magnetic transducer for converting a magnetic signal to an electric signal from the periphery; a second step of forming a magnetic isolation layer by using ruthenium (Ru) on the magnetic shield layer; a third step of forming a first magnetic pole on the magnetic isolation layer by using an iron cobalt alloy (FeCo) containing iron (Fe) in a range of 60 at % to 80 at % and having saturation magnetic flux density of 2.4 T (tesla) or higher, thereby magnetically isolating the magnetic shield layer and the first magnetic pole from each other via the magnetic isolation layer; a fourth step of forming a gap layer on the first magnetic pole; and a fifth step of forming a second magnetic pole on the gap layer so that the first and second magnetic poles are opposed to each other via the gap layer.

On a magnetic recording apparatus of an embodiment of the invention, a recording medium and a thin film magnetic head for performing a magnetic process on the recording medium are mounted. The thin film magnetic head includes: a first magnetic pole and a second magnetic pole which are adjacent to a gap layer, face each other, and generate a magnetic field for magnetizing the recording medium along the surface of the recording medium; a magnetic shield layer for magnetically shielding a magnetic transducer for converting a magnetic signal to an electric signal from the periphery; and a magnetic isolation layer disposed between the first magnetic pole and the magnetic shield layer so as to be adjacent to the first magnetic pole and the magnetic shield layer, and magnetically isolating between the first pole and the magnetic shield layer, the first magnetic pole is made of an iron cobalt alloy (FeCo) containing iron (Fe) in a range of 60 at % to 80 at % and having saturation magnetic flux density of 2.4 T (tesla) or higher, and the magnetic isolation layer is made of ruthenium (Ru).

In the thin film magnetic head and the magnetic recording apparatus of an embodiment of the invention; in the case where the first magnetic pole is made of an iron cobalt alloy containing iron in a range of 60 at % to 80 at % and having saturation magnetic flux density of 2.4 T or higher, the magnetic isolation layer made of ruthenium is provided between the first magnetic pole and the magnetic shield layer. In this case, as compared with the case where the magnetic isolation layer is not provided between the first magnetic pole and the magnetic shield layer, the strength of the recording magnetic field is higher and a reproduction output of the magnetic transducer is more stable.

In the thin film magnetic head manufacturing method of an embodiment of the invention, in the case of forming the first magnetic pole by using an iron cobalt alloy containing iron in a range of 60 at % to 80 at % and having saturation magnetic flux density of 2.4 T or higher, the magnetic isolation layer is formed by using ruthenium between the first magnetic pole and the magnetic shield layer. Consequently, as compared with the thin film magnetic head manufacturing method in which the magnetic isolation layer is not formed between the first magnetic pole and the magnetic shield layer, only by adding a simple process of forming the magnetic isolation layer, as described above, a thin film magnetic head in which the strength of the recording magnetic field is increased and a reproduction output of the magnetic transducer is stabilized is manufactured.

In the thin film magnetic recording head of an embodiment of the invention, preferably, the thickness of the magnetic isolation layer lies in the range from 1 nm to 10 nm, and the thickness of the first magnetic pole lies in the range from 100 nm to 500 nm. Preferably, the gap layer is made of ruthenium (Ru), and the second magnetic pole is made of an iron cobalt alloy (FeCo) containing iron (Fe) in a range of 60 at % to 80 at % and having saturation magnetic flux density of 2.4 T (tesla) or higher. In this case, it is preferable that the thickness of the gap layer lie in the range from 30 nm to 150 nm, and the thickness of the second magnetic pole lie in the range from 10 nm to 100 nm.

In the method of manufacturing a thin film magnetic head according to an embodiment of the invention, the steps of forming the first magnetic pole, the gap layer, and the second magnetic pole may include: a step of forming a magnetic layer for forming the first magnetic pole on the magnetic isolation layer by sputtering; a step of forming the gap layer so as to cover the magnetic layer; a step of forming the second magnetic pole on the gap layer; and a step of forming the first magnetic pole by continuously etching at least the gap layer and the magnetic layer while using the second magnetic pole as a mask to perform patterning.

In the thin film magnetic head and the magnetic recording apparatus of an embodiment of the invention, in the case where the first magnetic pole is made of an iron cobalt alloy containing iron in a range of 60 at % to 80 at % and having saturation magnetic flux density of 2.4 T or higher, the magnetic isolation layer made of ruthenium is provided between the first magnetic pole and the magnetic shield layer. Thus, both assurance of recording performance and assurance of reproduction performance can be satisfied.

In the thin film magnetic head manufacturing method of an embodiment of the invention, in the case of forming the first magnetic pole by using an iron cobalt alloy containing iron in a range of 60 at % to 80 at % and having saturation magnetic flux density of 2.4 T or higher, the magnetic isolation layer is formed by using ruthenium between the first magnetic pole and the magnetic shield layer. Thus, a thin film magnetic head realizing both assurance of recording performance and assurance of reproduction performance can be easily manufactured.

Other and further objects, features and advantages of the invention will appear more fully from the following description.

DETAILED DESCRIPTION OF THE PREFERRED EMBODIMENTS

Embodiments of the invention will be described in detail hereinbelow with reference to the drawings.

Figure 1:
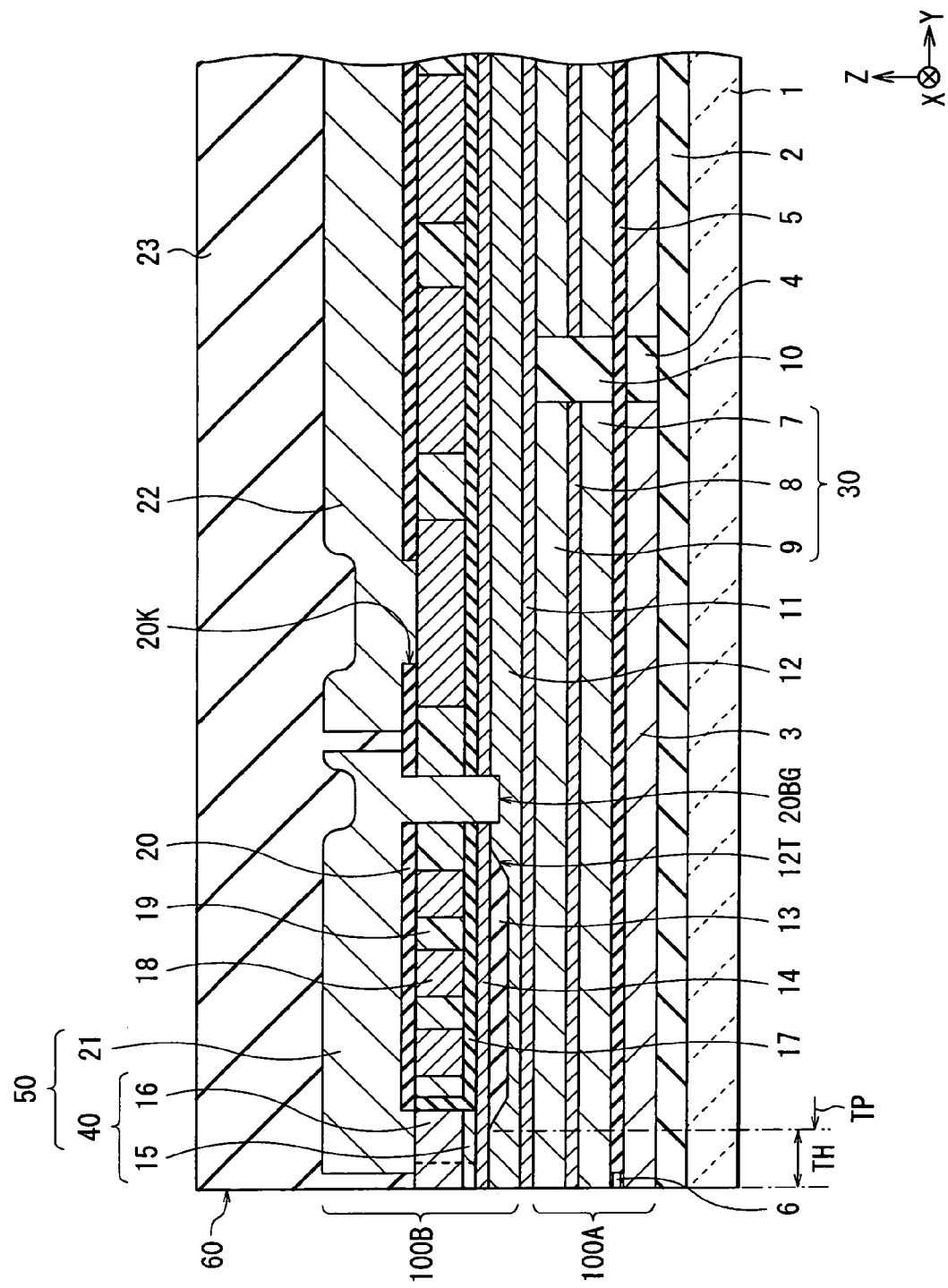
FIG. 1 is a cross section showing a sectional configuration (sectional configuration along a YZ plane) of a thin film magnetic head according to an embodiment of the invention.
Figure 2:
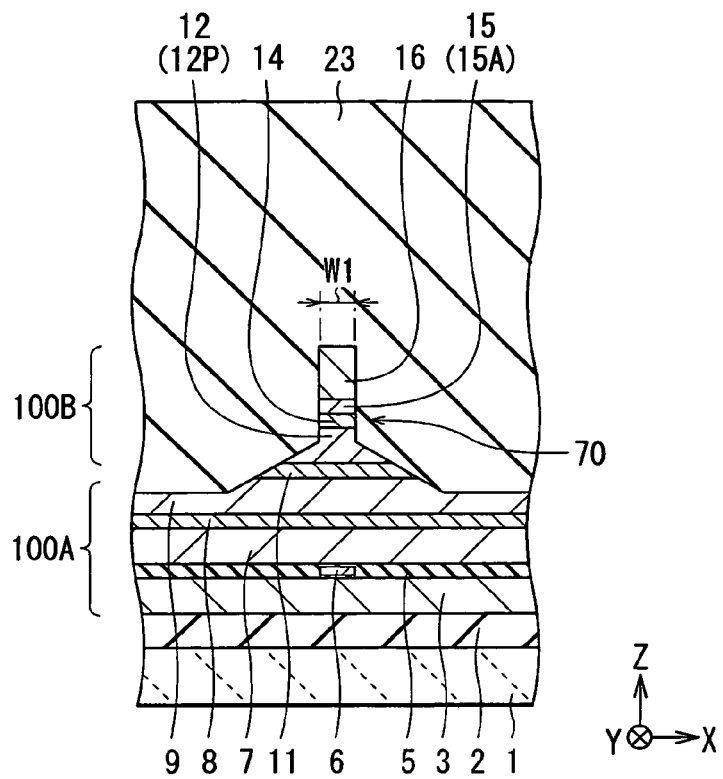
FIG. 2 is a plan view showing a sectional configuration (sectional configuration along an XZ plane) of the thin film magnetic head according to the embodiment of the invention.
Figure 3:
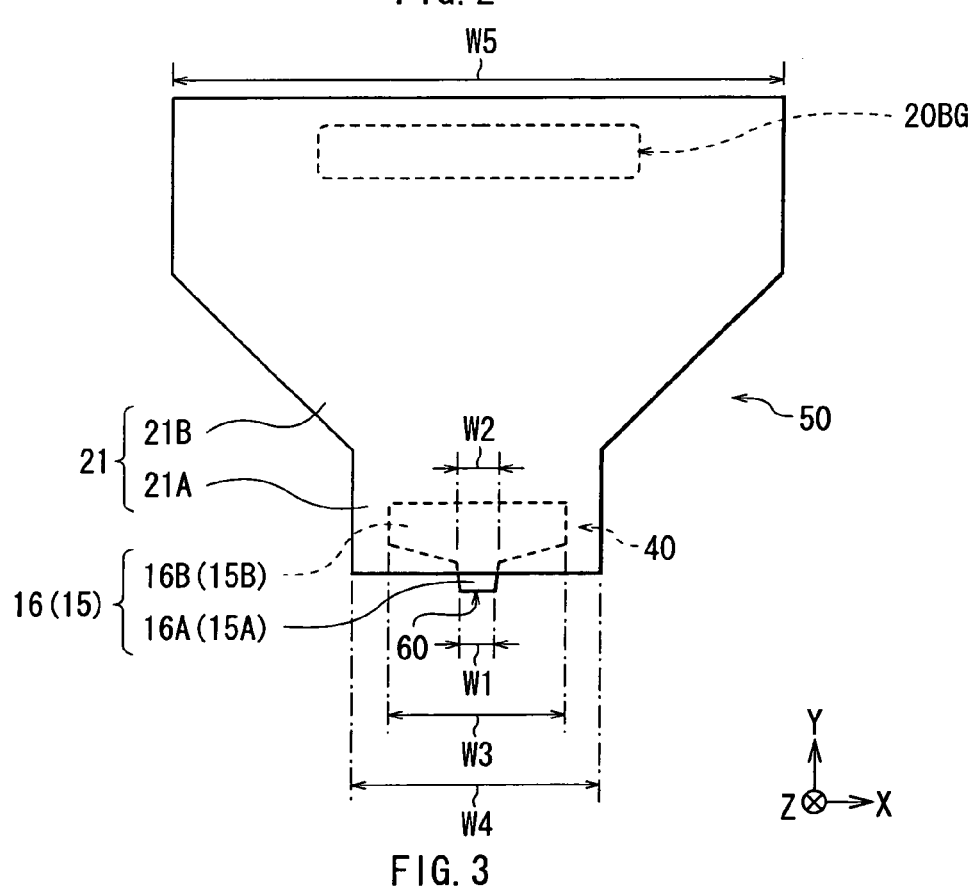
FIG. 3 is a plan view showing a configuration (plan view configuration seen from the Z-axis direction) of a main part in the thin film magnetic head illustrated in FIGS. 1 and 2.

First, the configuration of a thin film magnetic head according to an embodiment of the invention will be described by referring to FIGS. 1 to 3. FIGS. 1 to 3 show the configuration of the thin film magnetic head. FIG. 1 shows a sectional configuration perpendicular to an air bearing surface (sectional configuration along a YZ plane) of the whole. FIG. 2 shows a sectional configuration parallel to the whole air bearing surface (sectional configuration along an XZ plane) of the whole. FIG. 3 shows a plan view configuration of a main part of the thin film magnetic head (plan view configuration seen from the Z-axis direction).

In the following description, the dimension in the X-axis direction shown in FIGS. 1 to 3 will be described as "width" and the dimension in the Z-axis direction will be described as "thickness". The side close to the air bearing surface in the Y-axis direction will be described as "front" and the side opposite to the front will be described as "back". The side close to a substrate in the Z-axis direction will be described as "bottom" and the side opposite to the bottom will be described as "top". Those expressions will be similarly used in FIG. 4 and subsequent drawings.

The thin film magnetic head of the embodiment is, for example, mounted on a magnetic recording apparatus such as a hard disk drive to perform a magnetic process on a recording medium such as a hard disk. The thin film magnetic head is, for example, a composite thin film magnetic head capable of executing both of recording and reproducing processes as magnetic processes. As shown in FIGS. 1 and 2, the thin film magnetic head has a configuration obtained by sequentially stacking, on a substrate 1, a substrate insulating layer 2, a reproduction head portion 100A, a head isolation layer 11, a recording head portion 100B, and an overcoat layer 23.

The substrate 1 supports the whole thin film magnetic head. The substrate 1 is made of a ceramic material such as AlTiC ($Al_2O_3 \cdot TiC$).

The substrate insulating layer 2 electrically isolates between the substrate 1 and the reproduction head portion 100A and recording head portion 100B. The substrate insulating layer 2 is made of a non-magnetic insulating material such as aluminum oxide ($Al_2O_3$, hereinbelow, simply called "alumina") and has a thickness in a range of about 0.05 µm to 10 µm.

The reproduction head portion 100A executes a reproducing process by using a magneto-resistive effect (MR). The reproduction head portion 100A has, for example, as shown in FIGS. 1 and 2, a stacked layer structure in which a lower read shield layer 3, a shield gap layer 5, and an upper read shield layer 30 are stacked in this order. An MR element 6 as a reproduction element is buried in the shield gap layer 5 so that its one end surface is exposed in a recording-medium-facing surface (air bearing surface 60) which faces a recording medium (not shown).

The lower read shield layer 3 magnetically isolates the MR element 6 from the periphery. The lower read shield layer 3 extends rearward from the air bearing surface 60 and is made of, for example, a magnetic material such as nickel iron alloy ($Ni_{80}Fe_{20}$ as an example, which will be simply called "permalloy (trademark)" hereinbelow).

Specifically, the lower read shield layer 3 intermittently extends rearward, for example as shown in FIG. 1, and has a break in an area receded from a back gap 20BG which will be described later. A buried layer 4 made of a non-magnetic insulating material such as alumina is buried in the break position (space provided at the break position).

The shield gap layer 5 electrically isolates the MR element 6 from the periphery. The shield gap layer 5 is made of, for example, a nonmagnetic insulating material such as alumina and has a thickness of about 0.01 µm to 1 µm.

The MR element 6 is a magnetic transducer executing a reproducing process by converting a magnetic signal to an electric signal by using a magneto-resistive effect such as giant magneto-resistive effect (GMR), The upper read shield layer 30 magnetically isolates the MR element 6 from the periphery in a manner similar to the lower read shield layer 3. The upper read shield layer 30 extends rearward from the air bearing surface 60 and has, for example, a stacked layer structure (three-layer structure) in which an upper read shield layer portion 7, a nonmagnetic layer 8, and an upper read shield layer portion 9 are stacked in this order. Each of the upper read shield layer portions 7 and 9 is made of, for example, a magnetic material such as permalloy. The nonmagnetic layer 8 is made of, for example, a nonmagnetic material such as ruthenium (Ru). The upper read shield layer portion 9 of the upper read shield layer 30 is a magnetic shield layer to magnetically shield the MR element 6 from the periphery.

The head isolation layer 11 is provided between the reproduction head portion 100A and the recording head portion 100B and isolates between the reproduction head portion 100A and the recording head portion 100B. Specifically, the head isolation layer 11 is provided between the upper read shield layer portion 9 of the reproduction head portion 100A and a lower magnetic layer 12 (a narrow portion 12P) which will be described later of the recording head portion 100B so as to be adjacent to each of them. The Lead isolation layer 11 is a magnetic isolation layer to magnetically isolate between the lower magnetic layer 12 (the narrow portion 12P) and the upper read shield layer portion 9. The head isolation layer 11 is made of ruthenium (Ru) as a nonmagnetic material and has a thickness of about 1 nm to 10 nm. The expression of "magnetic isolation" indicates that ferromagnetic coupling between the upper read shield layer portion 9 and the lower magnetic layer 12 is cut, that is, the upper read shield layer portion 9 and the lower magnetic layer 12 are magnetostatically coupled to each other without being ferromagnetically coupled.

The reason why ruthenium-is preferable as the material of the head isolation layer 11 is as follows. For example, ruthenium has a property of being not easily diffused into a magnetic material, so that ruthenium is not easily diffused into both of the upper read shield layer portion 9 and the lower magnetic layer 12 to which the head isolation layer 11 is adjacent. That is, by selecting ruthenium as the material of the head isolation layer 11, decline in apparent saturation magnetic flux density in both of the upper read shield layer portion 9 and the lower magnetic layer 12 can be suppressed.

The reason why the thickness of the head isolation layer 11 is preferable to be about 1 nm to 10 nm is as follows. If the thickness is less than about 1 nm, the upper read shield layer portion 9 and the lower magnetic layer 12 are too close to each other and, due to this, they are unintentionally easily ferromagnetic-coupled to each other via the head isolation layer 11. On the other hand, if the thickness is greater than about 10 nm, the upper read shield layer 9 and the lower magnetic layer 12 are too far from each other and, due to this, the head isolation layer 11 unintentionally functions as a magnetic gap. When the head isolation layer 11 functions as a magnetic gap, a magnetic flux is unintentionally leaked from the magnetic gap, so that the strength of a magnetic field for recording (recording magnetic field) deteriorates or adjacent track erase (ATE) occurs. In short, by setting the thickness of the head isolation layer 11 to about 1 nm to 10 nm, the upper read shield layer 9 and the lower magnetic layer 12 can be magnetostatically coupled to each other through the head isolation layer 11 and decline in the recording magnetic field and the occurrence of the adjacent track erase caused by the presence of the head isolation layer 11 can be prevented.

Particularly, the upper read shield layer 30 intermittently extends rearward, for example, while being interrupted in some midpoint on the back side of the back gap 20G in a manner similar to the lower read shield layer 3. A buried layer 10 made of a non-magnetic insulating material such as alumina is buried in the interrupted portion.

The recording head portion 100B executes a recording process of a longitudinal recording method. The recording head portion 100B has, for example as shown in FIGS. 1 and 2, a stacked layer structure obtained by sequentially stacking the lower magnetic layer 12, a recording gap layer 14, a thin film coil 18 buried by coil insulating layers 17, 19 and 20, an upper magnetic layer 50, and a coil wiring layer 22.

The lower magnetic layer 12 forms a magnetic path, that is, a passage of the magnetic flux for recording generated in the thin film coil 18 and extends rearward from the air bearing surface 60. The lower magnetic layer 12 is formed of an iron cobalt alloy (FeCo) containing iron (Fe) of about 60 to 80 at % and having extremely high saturation magnetic flux density of about 2.4 T or higher and has a thickness of about 100 nm to 500 nm. An example of the iron cobalt alloy of this kind is an iron cobalt alloy ($Fe_{65}Co_{35}$) containing about 65 at % of iron (Fe) and about 35 at % of cobalt (Co).

The reason why the iron content in the iron cobalt alloy as the material of the lower magnetic layer 12 of about 60% to 80% is preferable is as follows. For example, if the content of iron is lower than about 60 at % or larger than about 80 at %, the high saturation magnetic flux density of about 2.4 T or higher cannot be obtained, so that recording performance deteriorates due to the insufficient strength of the recording magnetic field. In other words, by setting the content of iron in the iron cobalt alloy to about 60 to 80 at %, the high saturation magnetic flux density of about 2.4 T or higher is obtained, so that the strength of the recording magnetic field is assured and the recording performance can be improved.

The reason why the thickness of the lower magnetic layer 12 of about 100 nm to 500 nm is preferable is as follows. If the thickness is less than about 100 nm, the reception amount of the magnetic flux (so-called magnetic volume) received by the lower magnetic layer 12 becomes insufficient, so that the recording performance tends to deteriorate due to the insufficient strength of the recording magnetic field. On the other hand, if the thickness is greater than about 500 nm, residual stress inside the layer increases, so that the lower magnetic layer 12 comes off or a crack occurs easily in the lower magnetic layer 12 due to the residual stress. In other words, by setting the thickness of the lower magnetic layer 12 to about 100 nm to 500 nm, strength of the recording magnetic field is assured. Consequently, the recording performance can be improved and the layer quality of the lower magnetic layer 12 can be stabilized.

Particularly, for example, a TH specifying layer 13 is partially buried in the lower magnetic layer 12. More concretely, for example, a recess 12T is partially provided on the side adjacent to the recording gap layer 14 in the lower magnetic layer 12 so as not to penetrate the lower magnetic layer 12. The TH specifying layer 13 is buried in the recess 12T so as to be adjacent to the recording gap layer 14. The TH specifying layer 13 specifies a throat height TH as one of important factors of determining the recording performance of the thin film magnetic head and is formed of, for example, a nonmagnetic insulating material such as alumina. The front end position of the TH specifying layer 13 is a reference position for specifying the throat height TH (so-called throat height zero position TP). The throat height TH is the distance between the air bearing surface 60 and the throat height zero position TP.

The recording gap layer 14 is a gap layer providing a magnetic gap between the lower magnetic layer 12 and the upper magnetic layer 50 to generate the recording magnetic field and extends rearward from the air bearing surface 60. The recording gap layer 14 is made of, for example, ruthenium (Ru) as a nonmagnetic material in a manner similar to the head isolation layer 11 and has a thickness of about 30 nm to 150 nm.

The reason why ruthenium is preferable as the material of the recording gap layer 14 is that, for example, since etching speed at the time of ion milling of ruthenium is high, when a trim structure 70 is formed by etching (or trimming) the recording gap layer 14 and the lower magnetic layer 12 in a self aligned manner by using an upper pole tip layer 40, the trim structure 70 is easily formed with high precision in short time. That is, by using ruthenium as the material of the recording gap layer 14, the recording track width can be narrowed to a desired width on the basis of the trim structure 70.

The reason why the thickness of the recording gap layer 14 is preferable to be about 30 nm to 150 nm is as follows. If the thickness is less than about 30 nm, the recording gap layer 14 is too thin to easily function as a magnetic gap. Therefore, due to the fact that the recording magnetic field is not easily generated, the recording performance tends to deteriorate. On the other hand, if the thickness is greater than about 150 nm, the recording gap layer 14 is too thick, and the effective recording track width increases. Therefore, the recording track density decreases. In other words, by setting the thickness of the recording gap layer 14 to about 30 nm to 150 nm, the recording magnetic field is easily generated so that the recording performance can be improved and the recording track density can be increased.

The thin film coil 18 generates a magnetic flux for recording. The thin film coil 18 is made of, for example, a high-conductive material such as copper (Cu) and has a thickness of about 0.5 μm to 3 μm. Particularly, the thin film coil 18 has, for example, a winding structure that spirally winds around the back gap 20BG as a center. The winding width in the rear portion of the back gap 20BG is larger than that in the front portion.

Each of the coil insulating layers 17, 19, and 20 electrically isolates the thin film coil 18 from the periphery. The coil insulating layer 17 is provided so as to cover the bottom (the top face of the recording gap layer 14) and the side (the rear face of the upper pole tip layer 40 which will be described later of the upper magnetic layer 50) of a space surrounded by the recording gap layer 14 and the upper magnetic layer 50, that is, a space in which the thin film coil 18 is buried. The coil insulating layer 17 is made of, for example, a nonmagnetic insulating material such as alumina. The coil insulating layer 19 is provided so as to bury spaces between the turns of the thin film coil 18 and the periphery of the thin film coil 18. The coil insulating layer 19 is made of, for example, a nonmagnetic insulating material such as photoresist. The coil insulating layer 20 is provided so as to cover the top (the under face of a yoke layer 21 which will be described later of the upper magnetic layer 50) of the space in which the thin film coil 18 is buried. The coil insulating layer 20 is made of, for example, a nonmagnetic insulating material such as alumina.

In the coil insulating layer 20, for example, an opening 20K through which the thin film coil 18 and the coil wiring layer 22 are electrically connected is provided. In the coil insulating layers 17, 19, and 20, by penetrating the coil insulating layers 17, 19, and 20 and also the recording gap layer 14, the opening (back gap) 20BG for magnetically coupling the lower magnetic layer 12 and the upper magnetic layer 50 is provided so as to reach some midpoint in the lower magnetic layer 12.

The upper magnetic layer 50 forms a magnetic path in cooperation with the lower magnetic layer 12 and extends rearward from the air bearing surface 60. The upper magnetic layer 50 in the front portion is opposed to the lower magnetic layer 12 via the recording gap layer 14. The upper magnetic layer 50 in the rear portion is magnetically coupled to the lower magnetic layer 12 through the back gap 20BG. Specifically, the upper magnetic layer 50 includes the upper pole tip layer 40 and the yoke layer 21 formed as a layer different from the upper pole tip layer 40 and has a structure in which the upper pole tip layer 40 and the yoke layer 21 are magnetically coupled to each other.

The upper pole tip layer 40 is a portion for substantially generating the recording magnetic field by emitting the magnetic flux for recording and extends rearward from the air bearing surface 60 while being adjacent to the recording gap layer 14. Particularly, the upper pole tip layer 40 has a stacked layer structure (two-layer structure) in which a main upper pole tip layer 15 and an auxiliary upper pole tip layer 16 are stacked in this order.

The main upper pole tip layer 15 is a portion on which the magnetic flux for recording is concentrated and is adjacent to the recording gap layer 14. The main upper pole tip layer 15 is made of, for example, an iron cobalt alloy (FeCo) containing iron (Fe) of about 60 to 80 at % and having extremely high saturation magnetic flux density of about 2.4 T or higher like the material of the lower magnetic layer 12 and has a thickness of about 10 nm to 100 nm. An example of the iron cobalt alloy of this kind is an iron cobalt alloy ($Fe_{65}Co_{35}$) containing about 65 at % of iron (Fe) and about 35 at % cobalt (Co). The reason why about 60 to 80 at % is preferable as the content of iron in the iron cobalt alloy as the material of the main upper pole tip layer 15 and the reason why about 10 nm to 100 nm is preferable as the thickness of the main upper pole tip layer 15 are similar to the reason why about 60 to 80 at % is preferable as the content of iron in the iron cobalt alloy as the material of the lower magnetic layer 12 and the reason why about 100 nm to 500 nm is preferable as the thickness of the lower magnetic layer 12, respectively.

The main upper pole tip layer 15 has, for example as shown in FIG. 3, an almost battledore shape in plan view. More concretely, the main upper pole tip layer 15 includes, for example, in order from the side close to the air bearing surface 60, a front end portion 15A having a relatively narrow width and a rear end portion 15B magnetically coupled to the back side of the front end portion 15A and having a relatively wide width. The front end portion 15A and the rear end portion 15B are integrated. The width of the front end portion 15A is, for example, a width W1 that specifies the recording track width in the air bearing surface 60, and gradually increases with distance from the air bearing surface 60 to a width W2 larger than the width W1 (W2>W1). On the other hand, the width of the rear end portion 15B in the forward portion, for example, gradually increases from the width W2 to a width W3 larger than the width W2 (W3>W2) and is constant in the rear portion (width W3).

The auxiliary upper pole tip layer 16 is a portion for supplying a magnetic flux for recording received by the yoke layer 21 to the main upper pole tip layer 15 and is adjacent to both of the main upper pole tip layer 15 and the yoke layer 21. The auxiliary upper pole tip layer 16 is made of, for example, a magnetic material having high saturation magnetic flux density. The material of the auxiliary upper pole tip layer 16 may be, for example, a magnetic material similar to that of the main upper pole tip layer 15 or a magnetic material different from that of the main upper pole tip layer 15. An example of the material of the auxiliary upper pole tip layer 16 is iron nickel alloy (FeNi) having a high saturation magnetic flux density of about 2.0 T, more concretely, iron nickel alloy ($Fe_{85}Ni_{15}$) including about 85 at % of iron (Fe) and about 15 at % of nickel (Ni).

The auxiliary upper pole tip layer 16 has, for example, a plan view configuration similar to that of the main upper pole tip layer 15. To be specific, the auxiliary upper pole tip layer 16 has, as shown in FIG. 3, an almost battledore shape in plan view including a front end portion 16A (widths W1, and W2) corresponding to the front end portion 15A and a rear end portion 16B (widths W2 and W3) corresponding to the rear end portion 15B.

The yoke layer 21 is a portion for receiving the magnetic flux generated in the thin film coil 18 and extends rearward from a position receded from the air bearing surface 60 to the back gap 20BG while being provided on the upper pole tip layer 40. Specifically, the yoke layer 21 in the front portion extends on the upper pole tip layer 40, thereby being magnetically coupled to the upper pole tip layer 40. The yoke layer 21 in the rear portion extends through the back gap 20BG toward the lower magnetic layer 12 and is magnetically coupled to the lower magnetic layer 12. The yoke layer 21 is made of, for example, a magnetic material similar to the material of the auxiliary upper pole tip layer 16 in the upper pole tip layer 40 and has a thickness of about 0.5 µm to 5 µm.

The yoke layer 21 has, for example as shown in FIG. 3, an almost battledore shape in plan view corresponding to the plan shape of the upper pole tip layer 40. More concretely, the yoke layer 21 includes, in order from the side close to the air bearing surface 60, a front end portion 21A having a relatively narrow width and a rear end portion 21B magnetically coupled to the back side of the front end portion 21A and having a relatively wide width. The front end portion 21A and the rear end portion 21B are integrated. The width of the front end portion 21A is, for example, a width W4 larger than the width W3 of the upper pole tip layer 40 (W4>W3) and is constant in the whole. On the other hand, the width of the rear end portion 21B in the front portion gradually increases, for example, from the width W4 to a width W5 larger than the width W4 (W5>W4) and is constant (W5) in the rear portion. The tip of the yoke layer 21, that is, the front end of the front end portion 21A is, for example, positioned in a range where the front end portions 15A and 16A in the upper pole tip layer 40 (the main upper pole tip layer 15 and the auxiliary upper pole tip layer 16) extend.

To enable current to be passed to the thin film coil 18 from a not-shown external circuit, the coil wiring layer 22 is provided to electrically connect the external circuit to the thin film coil 18. The coil wiring layer 22 is, as shown in FIG. 1, electrically connected to one end of the thin film coil 18 through the opening 20K opened in the coil insulating layer 20. The other end of the thin film coil 18 is, although not shown in FIG. 1, electrically connected to an external circuit like the one end. The coil wiring layer 22 is made of, for example, a magnetic material similar to that of the yoke layer 21 in the upper magnetic layer 50 and has a thickness of about 0.5 µm to 5 µm.

The overcoat layer 23 protects the reproduction head portion 100A and the recording head portion 100B and is made of, for example, a non-magnetic insulating material such as alumina.

Particularly, in the lower magnetic layer 12, the recording gap layer 14, and the upper magnetic layer 50, as shown in FIGS. 2 and 3, both of the recording gap layer 14 and the lower magnetic layer 12 are trimmed in a self aligned manner in correspondence with the front end portion 15A of the main upper pole tip layer 15. Specifically, the recording gap layer 14 is partially narrowed so as to correspond to the front end portion 15A and the lower magnetic layer 12 is also partially narrowed so as to correspond to the front end portion 15A near the air bearing surface 60. Consequently, the front end portion 15A and the partially narrowed portion (the narrow portion 12P) in the lower magnetic layer 12 are opposed each other via the recording gap layer 14. As the stacked structure in which the front end portion 15A and the narrow portion 12P are opposed each other via the recording gap layer 14, the trim structure 70 is formed. The narrow portion 12P and the front end portion 15A constructing the trim structure 70 are main portions of the lower magnetic layer 12 and upper magnetic layer 50, which substantially generate the recording magnetic field. That is, the narrow portion 12P of the lower magnetic layer 12 is a first magnetic pole in the trim structure 70 and the front end portion 15A of the upper magnetic layer 50 is a second magnetic pole in the trim structure 70.

In the thin film head, when a current is passed from the not-shown external circuit to the thin film coil 18 of the recording head portion 100B at the time of recording information, a magnetic flux for recording is generated in the thin film coil 18. When the generated magnetic flux is received by the lower magnetic layer 12 and upper magnetic layer 50 (the upper pole tip layer 40 and the yoke layer 21), the magnetic flux flows mainly from the yoke layer 21 to the upper pole tip layer 40 (the main upper pole tip layer 15 and the auxiliary upper pole tip layer 16) in the upper magnetic layer 50 and reaches the front end portion 15A in the main upper pole tip layer 15. Since the magnetic flux passing in the upper magnetic layer 50 is converged while being gradually narrowed down as the width of each of the yoke layer 21 and the upper pole tip layer 40 decreases, the magnetic flux is finally concentrated on the front end portion 15A. When the magnetic flux concentrated on the front end portion 15A is leaked around the recording gap layer 14 at the time of flowing to the narrow portion 12P of the lower magnetic layer 12, a recording magnetic field is generated on the basis of the leaked magnetic flux, and the recording medium is magnetized along its surface by the recording magnetic field. As a result, information is magnetically recorded on the recording medium.

On the other hand, at the time of reproduction of information, when a sense current is passed to the MR element 6 in the reproduction head portion 100A, a magnetic signal of the recording medium is converted to an electric signal by the MR element 6. That is, since the resistance value of the MR element 6 changes in accordance with a signal magnetic field of the recording medium, the resistance change of the MR element 6 is detected as a change in the sense current. As a result, information recorded on the recording medium is magnetically reproduced.

Figure 14:
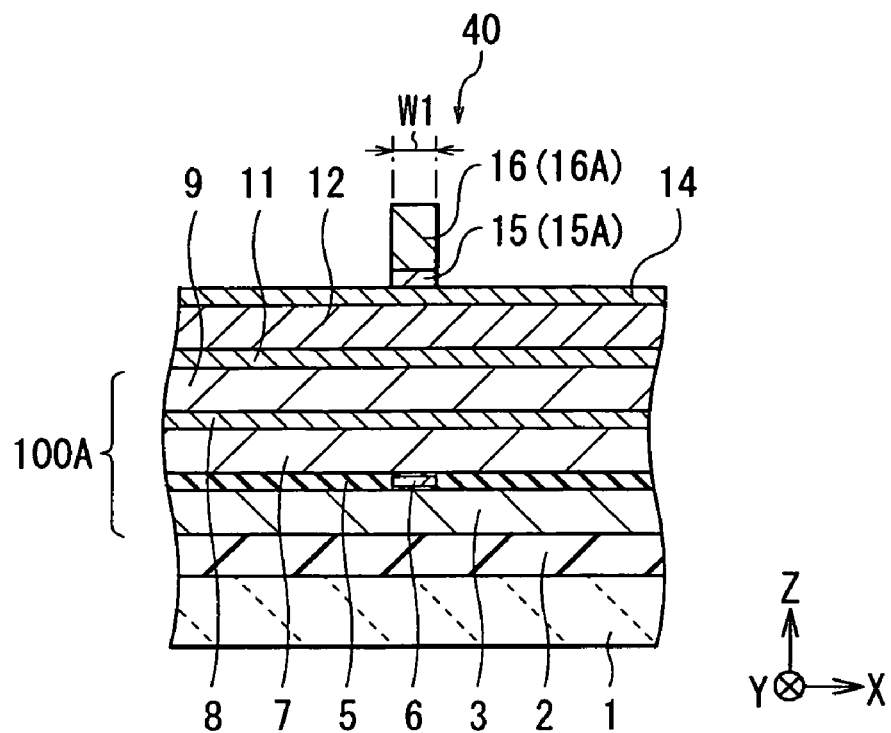
FIG. 14 is a cross section (along an XZ plane) illustrating processes corresponding to FIGS. 4 to 7.
Figure 15:
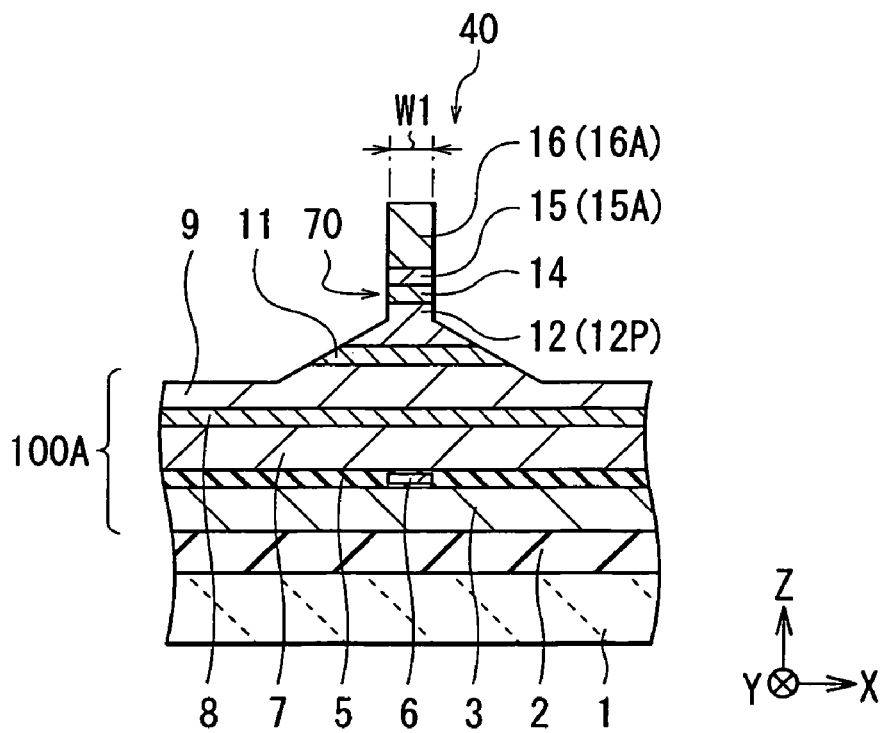
FIG. 15 is a cross section illustrating a process subsequent to FIG. 14.

Next, referring to FIGS. 1 to 15, a method of manufacturing the thin film magnetic head according to the embodiment will be described. FIGS. 4 to 15 are diagrams for explaining a method of manufacturing the thin film magnetic head. Each of FIGS. 4 to 13 shows a sectional configuration corresponding to FIG. 1. Each of FIGS. 14 and 15 shows a sectional configuration corresponding to FIG. 2. Since the materials, dimensions, and structural features of the series of components of the thin film magnetic head have been already described in detail, the material and the forming method of each of the components will be described with an example hereinbelow but the description of dimensions and structural features will not be repeated.

Figure 4:
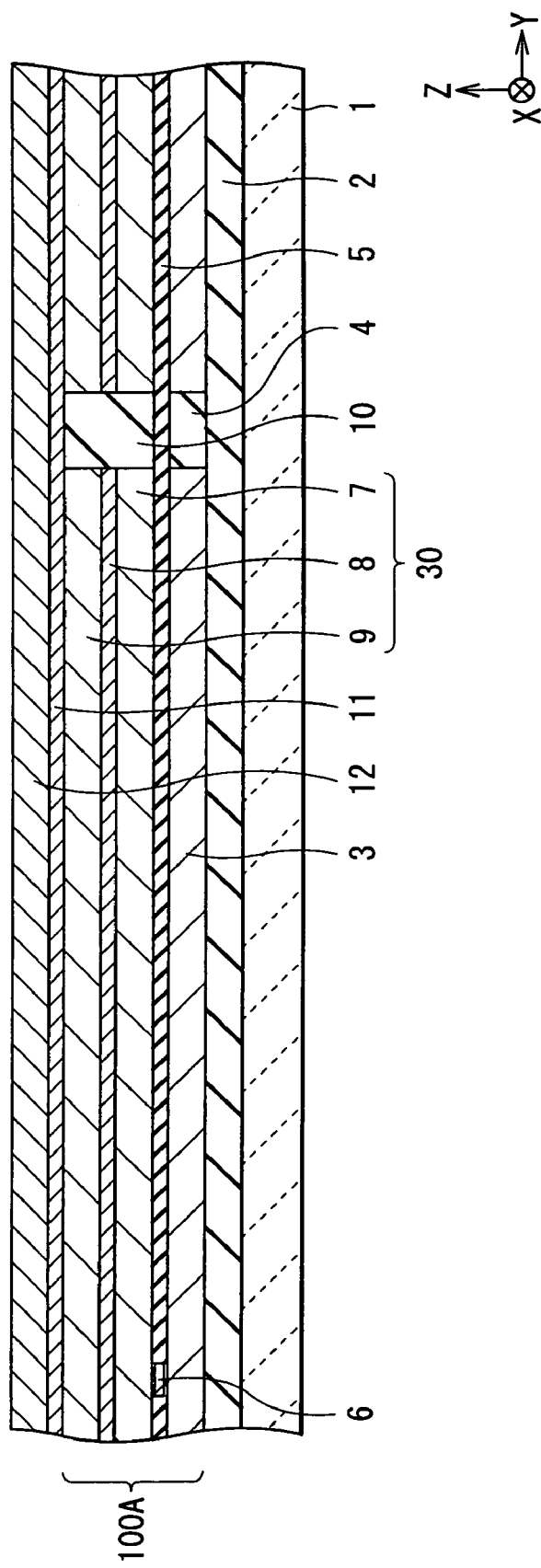
FIG. 4 is a cross section illustrating one process in a method of manufacturing the thin film magnetic head according to the embodiment of the invention.

At the time of manufacturing the thin film magnetic head according to the embodiment, first, the substrate 1 made of AlTiC is prepared. After that, as shown in FIGS. 4 and 14, alumina is deposited on the substrate 1 by using sputtering method, thereby forming the substrate insulating layer 2.

Subsequently, a permalloy plating film is grown on the substrate insulating layer 2 by using frame plating, thereby forming the lower read shield layer 3 so as to be interrupted in some midpoint. After that, alumina is deposited so as to bury the interrupted portion in the lower read shield layer 3 by using the sputtering method, thereby forming the buried layer 4. The detail procedure of the frame plating will be described later. At the time of forming the buried layer 4, for example, the alumina film is formed so as to cover the interrupted portion and the lower read shield layer 3 around the interrupted portion and, after that, the alumina film is polished until the lower read shield layer 3 is exposed, thereby burying the buried layer 4 in the interrupted portion.

After that, alumina is deposited on the lower read shield layer 3 and the buried layer 4 by using the sputtering method, thereby forming the shield gap layer 5. At the time of forming the shield gap layer 5, the MR element 6 is buried.

Subsequently, the upper read shield layer 30 is formed on the shield gap layer 5 so as to be interrupted in some midpoint. After that, alumina is deposited so as to bury the interrupted portion in the upper read shield layer 30 by using the sputtering method, thereby forming the buried layer 10. At the time of forming the upper read shield layer 30, the permalloy plating film is grown on the shield gap layer 5 by using the frame plating to form the upper read shield layer portion 7. Subsequently, by using the sputtering method, ruthenium is deposited on the upper read shield layer portion 7 to form the nonmagnetic layer 8. After that, the permalloy plating film is grown on the nonmagnetic layer 8 by using the frame plating, so that the upper read shield layer portion 9 is formed. As a result, the upper read shield layer 30 has a stacked layer structure (three-layer structure) in which the upper read shield layer portion 7, the nonmagnetic layer 8, and the upper read shield layer portion 9 are stacked in this order. At the time of forming the buried layer 10, for example, the buried layer 10 is buried in the interrupted portion in a manner similar to the case of forming the buried layer 4 by polishing the alumina film. In such a manner, the reproduction head portion 100A is formed so as to have the stacked structure of the series of layers from the lower read shield layer 3 to the upper read shield layer 30.

By depositing ruthenium on the upper read shield later 30 and the buried layer 10 by the sputtering method, the head isolation layer 11 is formed. After that, as necessary, by polishing the surface of the head isolation layer 11, the head isolation layer 11 may be planarized.

Subsequently, iron cobalt alloy is deposited on the head isolation layer 11 by the sputtering method, thereby forming the iron cobalt alloy film. After that, by patterning the iron cobalt alloy film by using photolithography and etching, the lower magnetic layer 12 is formed as a magnetic layer for forming the narrow portion 12P. At the time of forming the lower magnetic layer 12, the iron cobalt alloy containing about 60 to 80 at % of iron (Fe) and having extremely high saturation magnetic flux density is used. More concretely, the iron cobalt alloy ($Fe_{65}Co_{35}$) containing about 65 at % of iron (Fe) and about 35 at % of cobalt (Co) is used.

Figure 5:
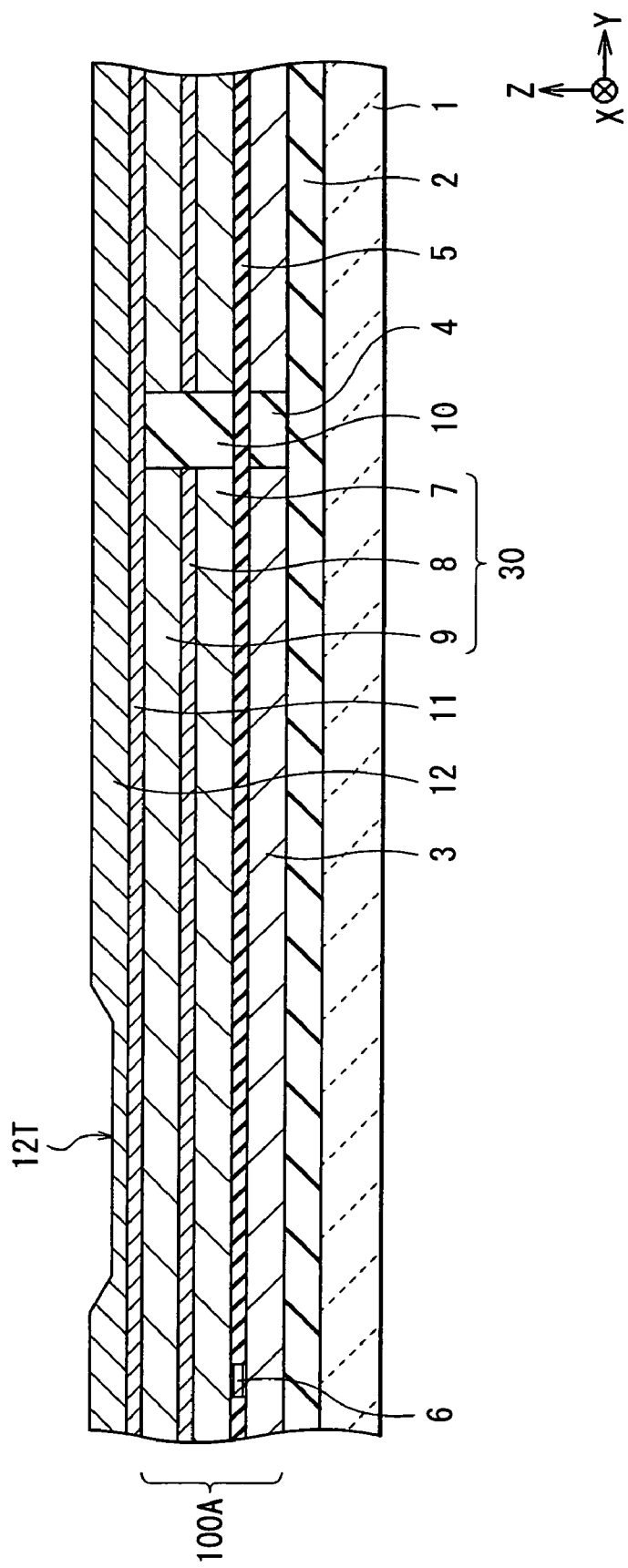
FIG. 5 is a cross section illustrating a process subsequent to FIG. 4.

By selectively etching the lower magnetic layer 12 by using the etching method, the recess 12T is formed as shown in FIG. 5. At the time of forming the recess 12T, the formation position of the recess 12T is adjusted considering that the throat height TH (refer to FIG. 1) is specified on the basis of the formation position of the TH specifying layer 13 which will be filled in the recess 12T in a post process.

Figure 6:
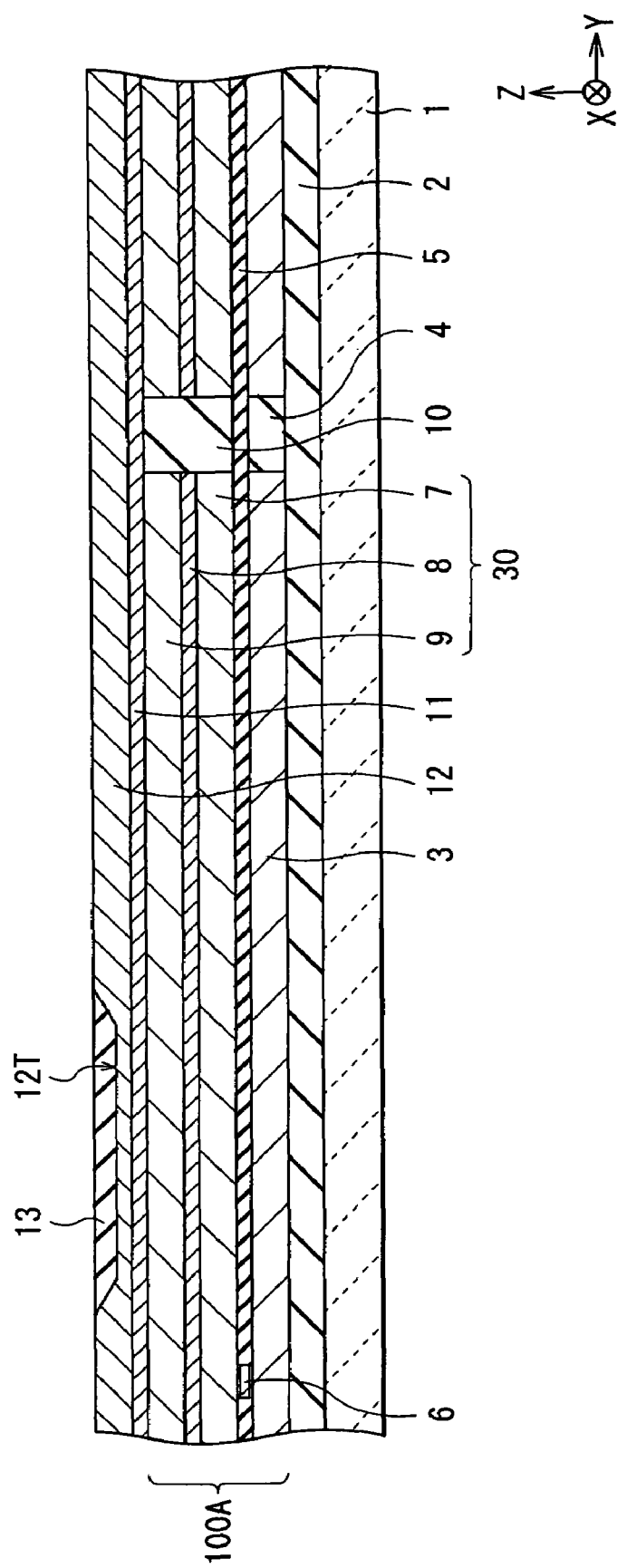
FIG. 6 is a cross section illustrating a process subsequent to FIG. 5.

Alumina is deposited so as to be filled in the recess 12T by using the sputtering method, thereby forming the TH specifying layer 13 as shown in FIG. 6. At the time of forming the TH specifying layer 13, for example, an alumina film is formed so as to cover the recess 12T and the lower magnetic layer 12 around the recess 12T and, after that, the alumina film is polished until the lower magnetic layer 12 is exposed, thereby filling the recess 12T with the TH specifying layer 13.

Figure 7:
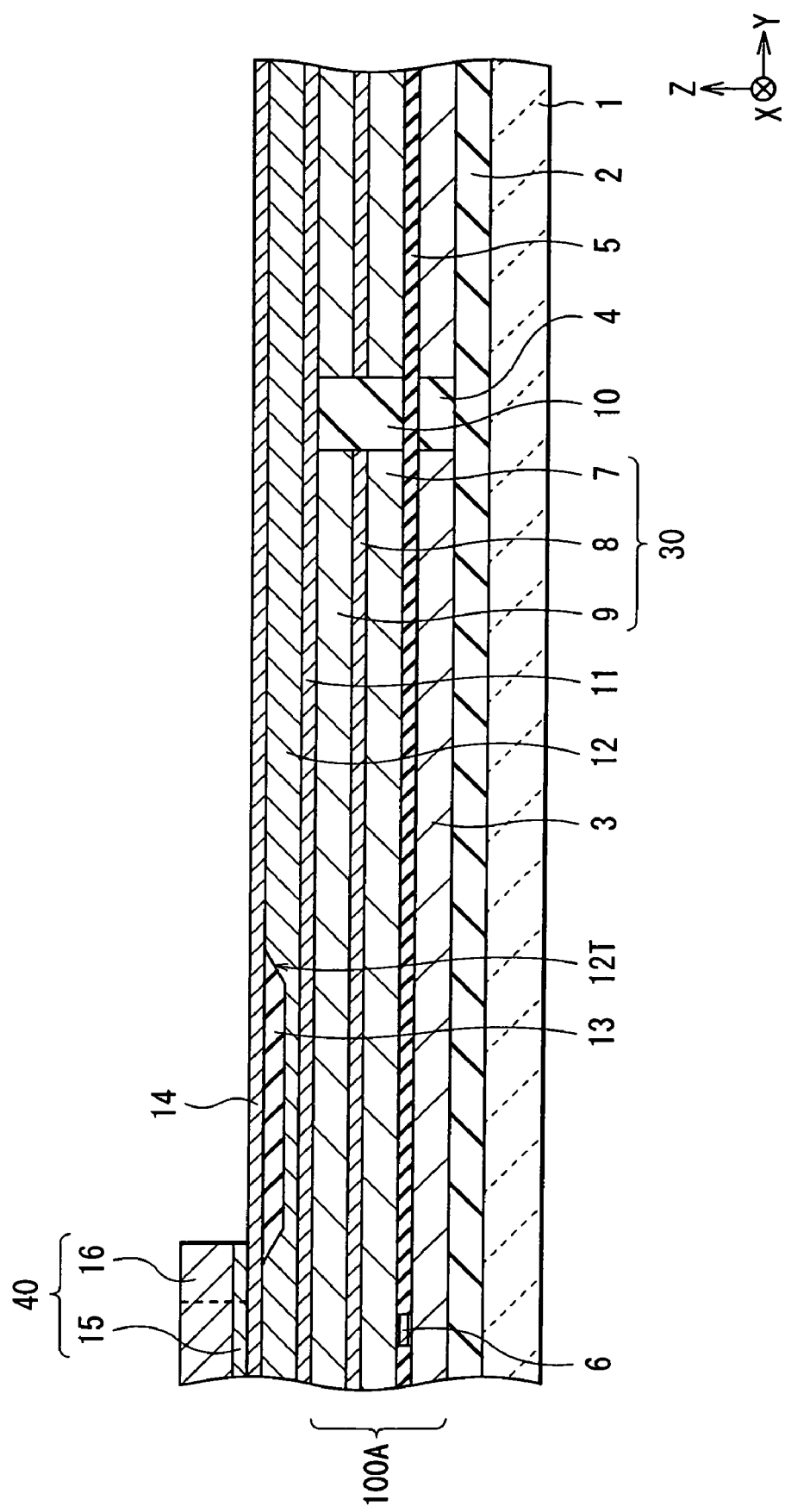
FIG. 7 is a cross section illustrating a process subsequent to FIG. 6.

Ruthenium is deposited on the lower magnetic layer 12 and the TH specifying layer 13 by the sputtering method, thereby forming the recording gap layer 14 as shown in FIGS. 7 and 14.

Subsequently, an iron cobalt alloy is deposited on the recording gap layer 14 by using the sputtering method, thereby forming an iron cobalt alloy film. After that, the iron cobalt alloy film is patterned by using photolithography and etching, thereby forming the main upper pole tip layer 15. At the time of forming the main upper pole tip layer 15, an iron cobalt alloy which contains about 60 to 80 at % of iron and has the extremely high saturation magnetic flux density of about 2.4 T or higher is used. More concretely, the iron cobalt alloy ($Fe_{65}Co_{35}$) containing about 65 at % of iron (Fe) and about 35 at % of cobalt (Co) is used. As shown in FIG. 3, the main upper pole tip layer 15 is formed so as to have an almost battledore shape in plan view including the front end portion 15A and the rear end portion 15B.

A plating film of an iron cobalt alloy is grown on the main upper pole tip layer 15 by using the frame plating, thereby forming the auxiliary upper pole tip layer 16. At the time of forming the auxiliary upper pole tip layer 16, an iron nickel alloy having a high saturation magnetic flux density of about 2.0 T is used, more concretely, an iron nickel alloy ($Fe_{85}Ni_{15}$) containing about 85 at % of iron (Fe) and about 15 at % of nickel is used. As shown in FIG. 3, the auxiliary upper pole tip layer 16 is formed so as to have an almost battledore shape in plan view including the front end portion 16A and the rear end portion 16B. In such a manner, the upper pole tip layer 40 in which the main upper pole tip layer 15 and the auxiliary upper pole tip layer 16 are stacked in this order is formed.

An example of the procedure of forming the auxiliary upper pole tip layer 16 by using the frame plating is as follows. First, a photoresist is applied on the surfaces of the main upper pole tip layer 15 and the recording gap layer 14 around the main upper pole tip layer 15, thereby forming a photoresist film (not shown). Subsequently, the photoresist film is patterned (exposure and development) by using the photolithography method, thereby forming a photoresist pattern (not shown) so as to include an opening for forming the auxiliary upper pole tip layer 16 in a position corresponding to the formation position of the main upper pole tip layer 15. After that, by growing a plating film in the opening formed in the photoresist pattern by using the main upper pole tip layer 15 as a seed layer, the auxiliary upper pole tip layer 16 is formed. Finally, the photoresist pattern is removed. As a result, the auxiliary upper pole tip layer 16 is formed by using the flame prating.

By selectively etching the recording gap layer 14 and the lower magnetic layer 12 while using the upper pole tip layer 40 (the main upper pole tip layer 15 and the auxiliary upper tip layer 16) as a mask, as shown in FIGS. 7 and 15, the recording gap layer 14 and the lower magnetic layer 12 are etched down along the upper pole tip layer 40. In this case, for example, to completely etch the recording gap layer 14 and the lower magnetic layer 12, the head isolation layer 11 and the upper read shield layer portion 9 are also etched together with the recording gap layer 14 and the lower magnetic layer 12 to some midpoint of the upper read shield layer portion 9. At the time of etching the recording gap layer 14, lower magnetic layer 12, head isolation layer 11, and upper read shield layer portion 9, etching residues are accumulated as the etching process proceeds. Specifically, the speed of etching on the side close to the upper pole tip layer 40 becomes slow relative to that on the side far from the upper pole tip layer 40 in the width direction (X-axis direction) due to the phenomenon of accumulation of etching residues. Therefore, by reflecting the difference in the etching speed, an etching surface is tapered from the lower magnetic layer 12 through the head isolation layer 11 to the upper read shield layer 9. As a result, a portion corresponding to the front end portion 15A, in the lower magnetic layer 12 is partially narrowed, thereby forming the narrow portion 12P. Therefore, the trim structure 70 is formed as a stacked structure in which the front end portion 15A and the narrow portion 12P are opposed each other via the recording gap layer 14.

Figure 8:
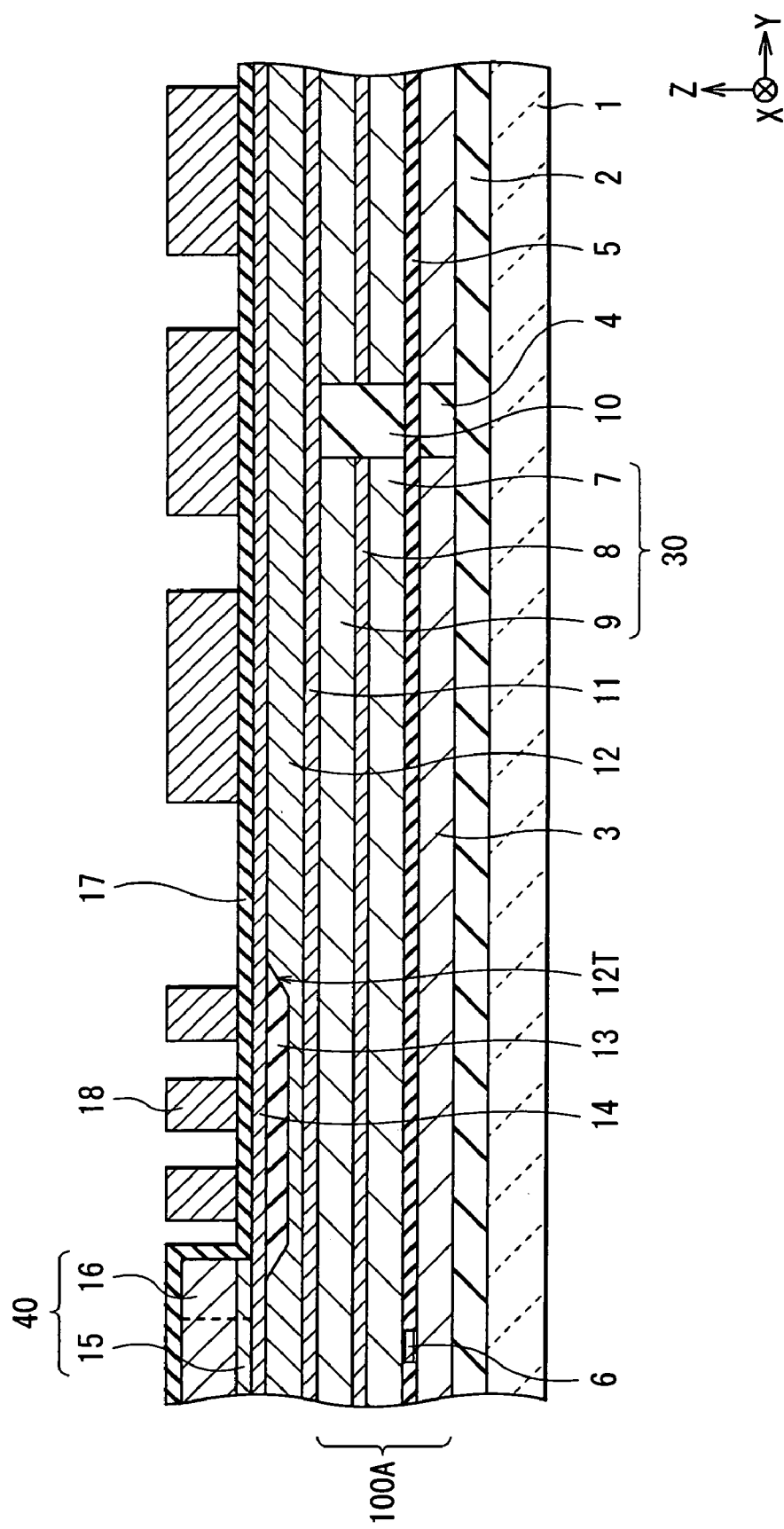
FIG. 8 is a cross section illustrating a process subsequent to FIG. 7.

Subsequently, alumina is deposited so as to cover the upper pole tip layer 40 and the recording gap layer 14 of its periphery by using the sputtering method, thereby forming the coil insulating layer 17 as shown in FIG. 8.

After that, a copper plating film is selectively grown on the coil insulating layer 17 on the back side of the upper pole tip layer 40 by using the frame plating, thereby forming the thin film coil 18. The thin film coil 18 is formed so as to have a winding structure of spiral turns and so that the width of the turns in the rear portion is larger than that in the front portion.

Figure 9:
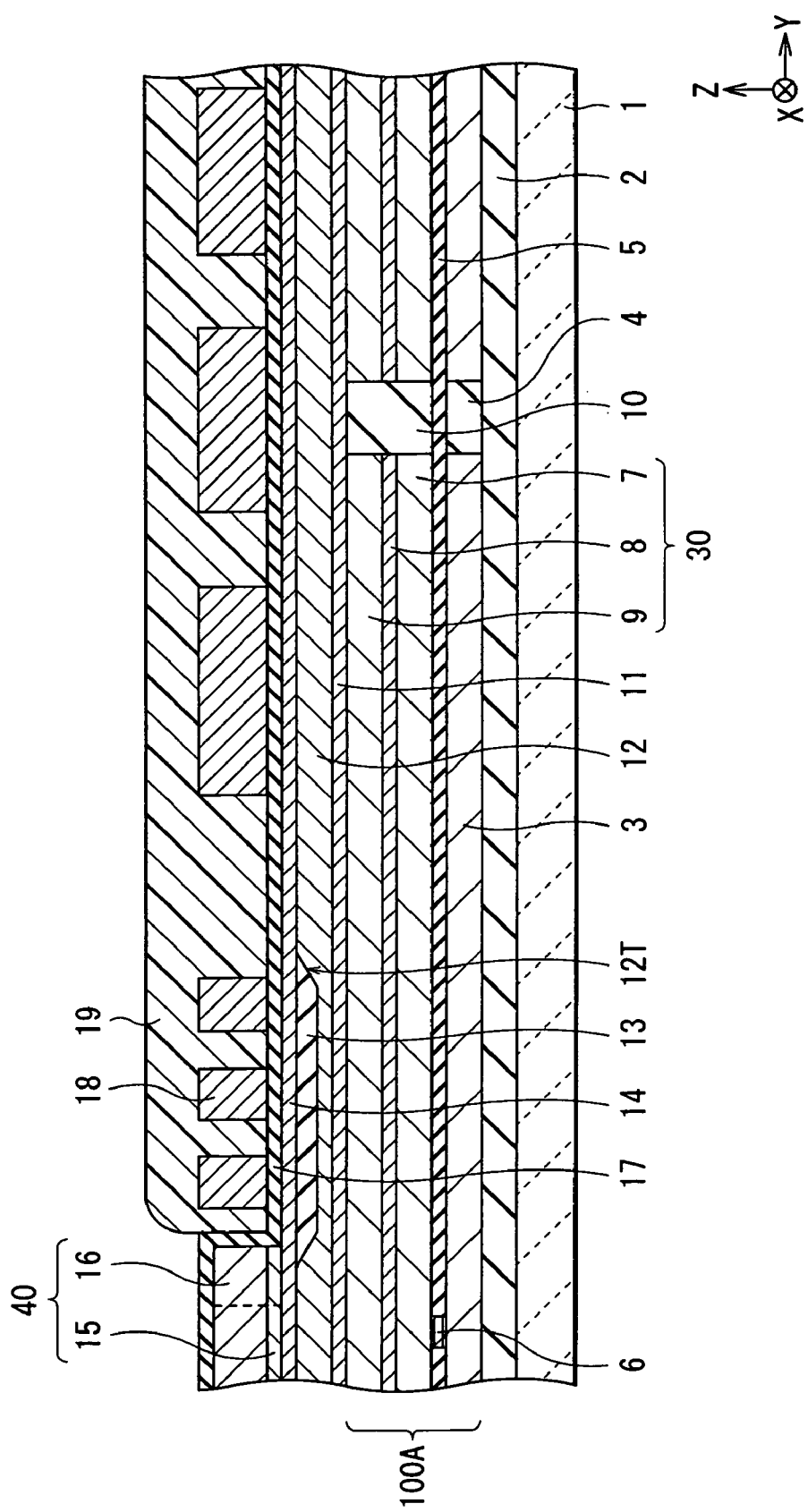
FIG. 9 is a cross section illustrating a process subsequent to FIG. 8.

The photoresist film is formed so as to cover the thin film coil 18 (the turns and the spaces between the turns) and the peripheral area of the thin film coil 18. The photoresist film is patterned by using the photolithography method and, after that, is heated, thereby forming the coil insulating layer 19 as shown in FIG. 9. Since the photoresist flows due to the heating of the photoresist film, the end portions of the coil insulating layer 19 are rounded.

Figure 10:
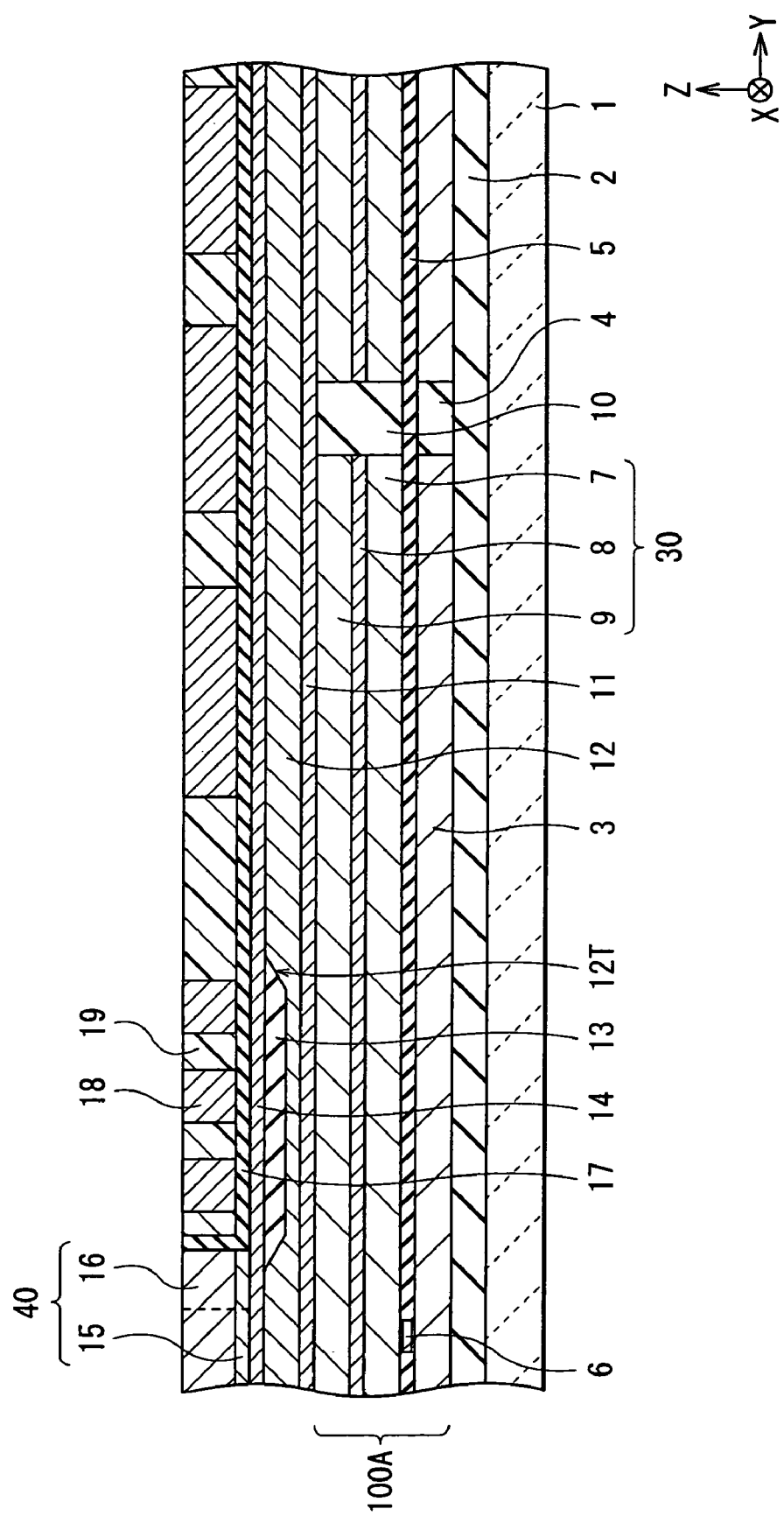
FIG. 10 is a cross section illustrating a process subsequent to FIG. 9.

Subsequently, as shown in FIG. 10, at least the coil insulating layers 17 and 19 are polished and planarized until both the upper pole tip layer 40 and the thin film coil 18 are exposed. In this case, for example, not only the coil insulating layers 17 and 19 but also the upper pole tip layer 40 and thin film coil 18 are polished. The polishing amount is adjusted so that the upper pole tip layer 40 has a desired thickness.

Figure 11:
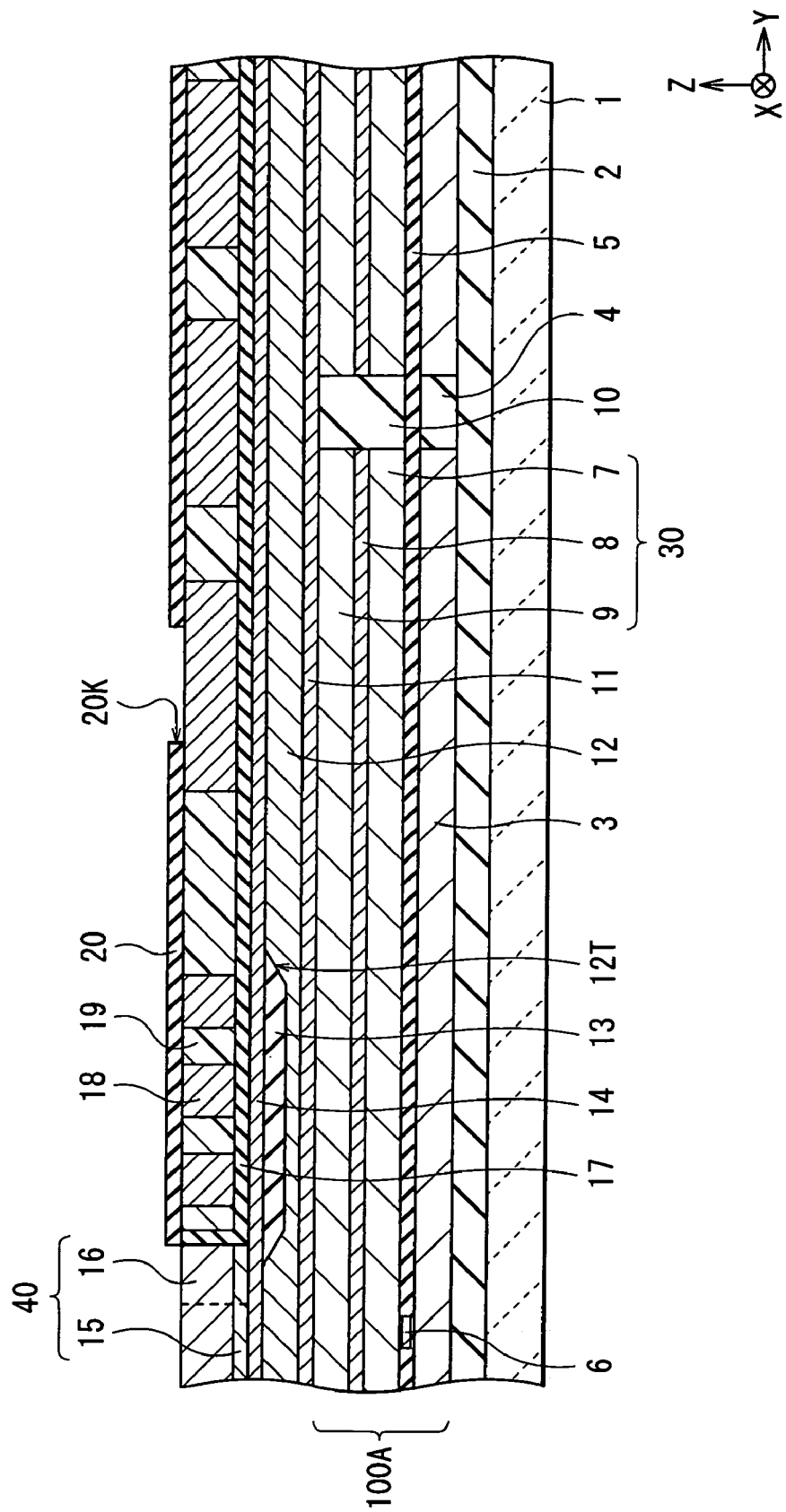
FIG. 11 is a cross section illustrating a process subsequent to FIG. 10.

By using the photolithography method, sputtering method, and lift-off method, alumina is deposited on the thin film coil 18 and the peripheral area to form the coil insulating layer 20 as shown in FIG. 11. The coil insulating layer 20 is formed so that the upper pole tip layer 40 is exposed and the opening 20K for exposing one end of the thin film coil 18 is provided.

Figure 12:
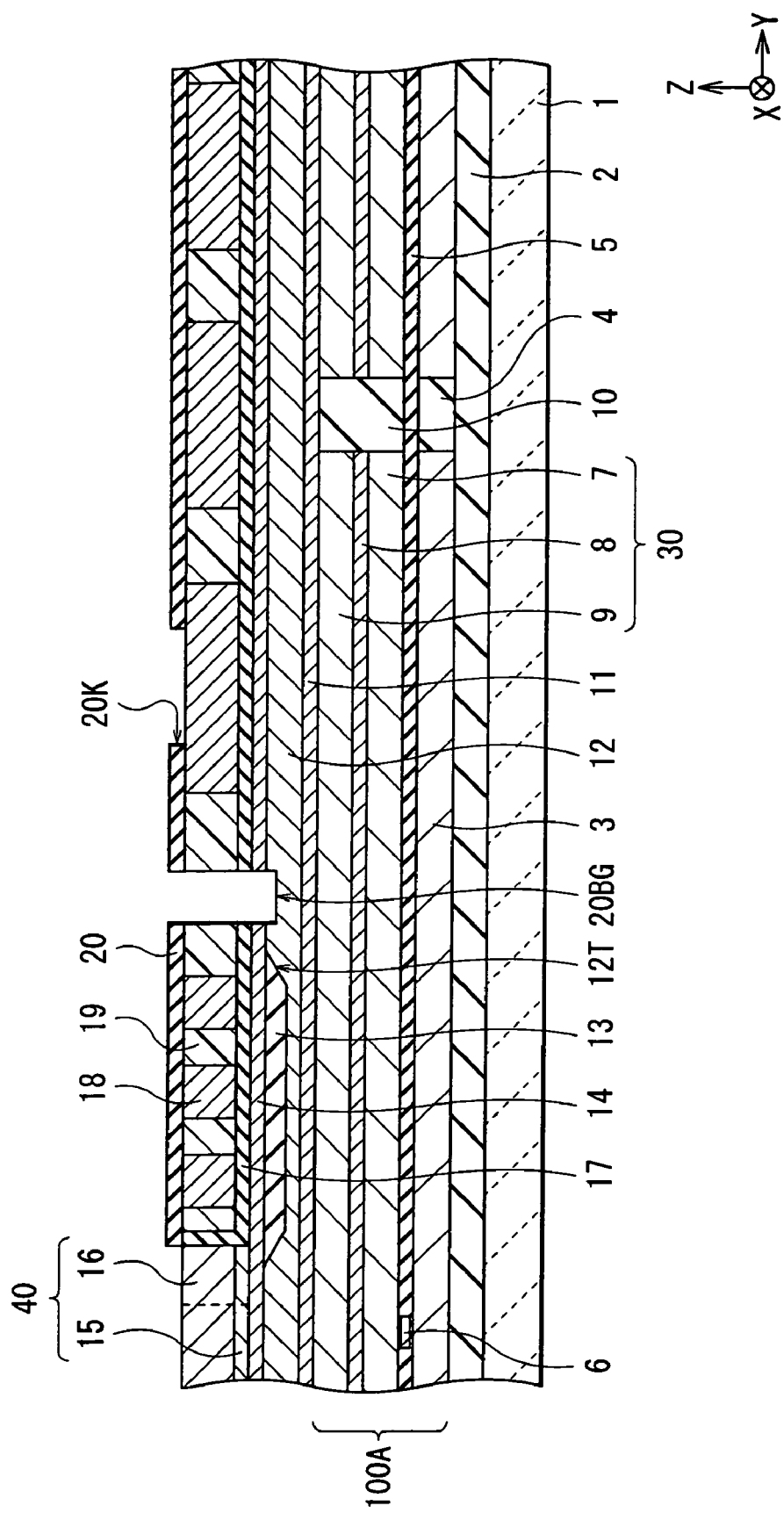
FIG. 12 is a cross section illustrating a process subsequent to FIG. 11.

The coil insulating layers 20, 19 and 17, the recording gap layer 14, and the lower magnetic layer 12 are selectively etched down by using the photolithography method and the etching method, thereby forming the back gap 20BG as shown in FIG. 12. At this time of forming the back gap 20BG, the back gap 20BG is adjusted so as to be positioned in the center of winding turns of the thin film coil 18 and the lower magnetic layer 12 is etched halfway.

Figure 13:
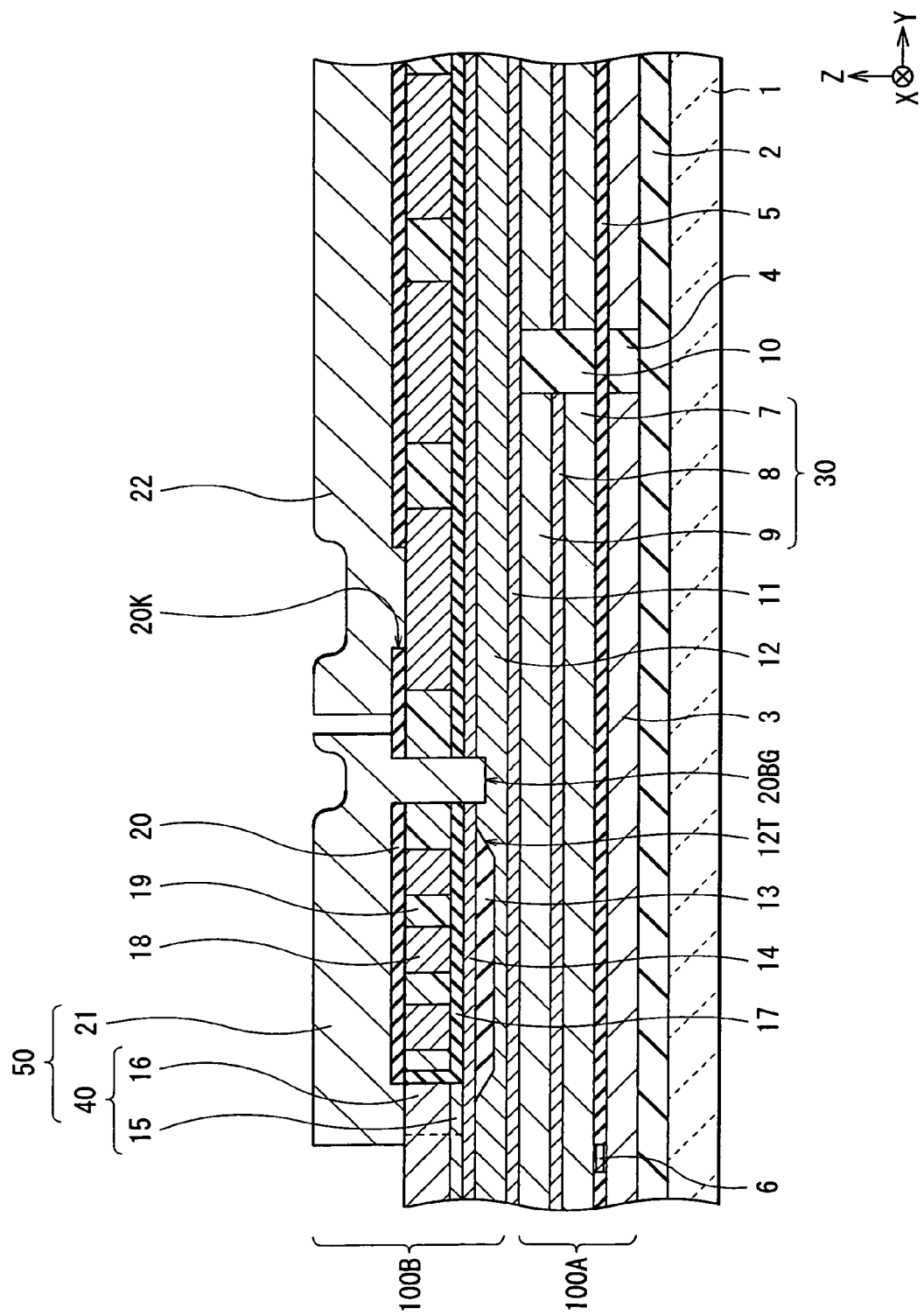
FIG. 13 is a cross section illustrating a process subsequent to FIG. 12.

Subsequently, an iron cobalt alloy film is formed on the area from the upper pole tip layer 40 to the back gap 20BG by the frame plating, thereby forming the yoke layer 21 as shown in FIG. 13. The yoke layer 21 is formed by using an iron cobalt alloy similar to the material of the auxiliary upper pole tip layer 16 so as to have an almost battledore shape in plan view including the front end portion 21A and the rear end portion 21B as shown in FIG. 3. In such a manner, the upper magnetic layer 50 including the upper pole tip layer 40 and the yoke layer 21 is formed.

Particularly, at the time of forming the yoke layer 21, the iron cobalt alloy film is formed on not only the area from the upper pole tip layer 40 to the back gap 20BG but also an area extending rearward from the opening 20K, thereby forming the yoke layer 21 and the coil wiring layer 22 in a lump. As a result, the recording head portion 100B is formed so as to have the stacked structure of the series of layers from the lower magnetic layer 12 to the upper magnetic layer 50 and the coil wiring layer 22.

Finally, the overcoat layer 23 is formed so as to cover the upper magnetic layer 50 and the peripheral area of the upper magnetic layer 50 by using the sputtering method as shown in FIG. 1 and the stacked structure of the series of layers from the substrate 1 to the overcoat layer 23 is polished along the XZ plane until the MR element 6 is exposed, thereby forming the air bearing surface 60. In such a manner, the thin film magnetic head is completed.

Figure 16:
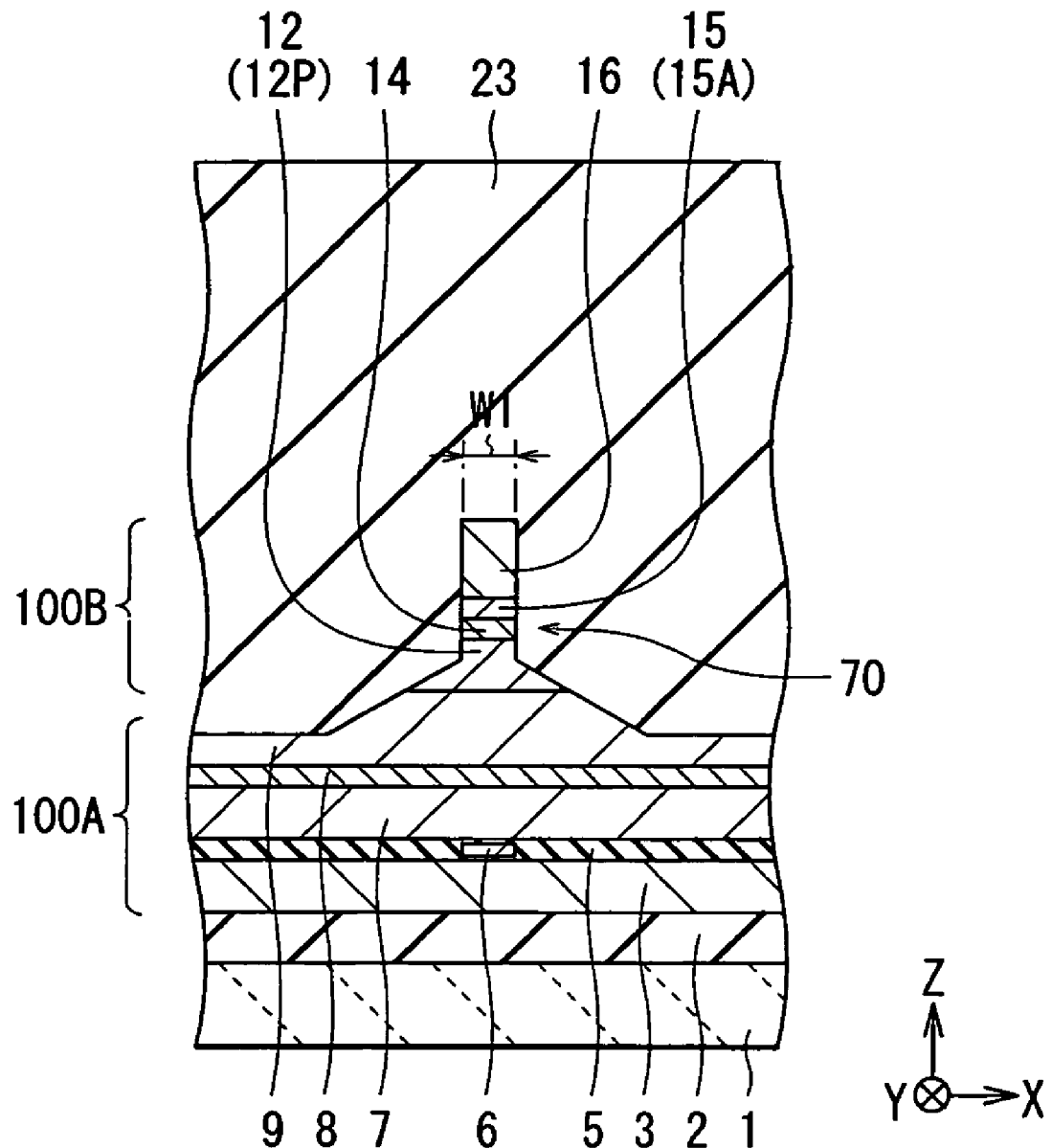
FIG. 16 is a cross section showing a sectional configuration (sectional configuration along an XZ plane) of a thin film magnetic head as a comparative example of the thin film magnetic head according to the embodiment of the invention.

In the thin film magnetic head according to the embodiment, the head isolation layer 11 made of ruthenium is provided between the lower magnetic layer 12 and the upper read shield layer portion 9 in the case where the lower magnetic layer 12 is made of an iron cobalt alloy (such as $Fe_{65}Co_{35}$) having extremely high saturation magnetic flux density of about 2.4 T or higher. Therefore, both assurance of the recording performance and assurance of reproduction performance can be satisfied for the following reasons FIG. 16 is a diagram illustrating the configuration of a thin film magnetic head as a comparative example of the thin film magnetic head according to the embodiment and shows a sectional configuration corresponding to FIG. 2 (sectional configuration along the XZ plane). In the thin film magnetic head of the comparative example, the head isolation layer 11 is not provided between the lower magnetic layer 12 and the upper read shield layer portion 9 in the case where the lower magnetic layer 12 is made of an iron cobalt alloy having the extremely high saturation magnetic flux density of about 2.4 T or higher. That is, the thin film magnetic head of comparative example has a configuration similar to that of the thin film magnetic head according to the embodiment (refer to FIG. 2) except for the point that the lower magnetic layer 12 and the upper read shield layer portion 9 are adjacent to each other.

In the thin film magnetic head of the comparative example (refer to FIG. 16), when the lower magnetic layer 12 has extremely high saturation magnetic flux density of about 2.4 T or higher, the main upper pole tip layer 15 of the upper magnetic layer 50 also has extremely high saturation magnetic flux density of about 2.4 T or higher. Therefore, the amount of a magnetic flux which flows in the lower magnetic layer 12 and the main upper pole tip layer 15 increases. Since the intensity of the recording magnetic field accordingly increases, recording performance is assured.

In the thin film magnetic head of the comparative example, however, in the case where the lower magnetic layer 12 has extremely high saturation magnetic flux density of about 2.4 T or higher, since the lower magnetic layer 12 is in contact with the upper read shield layer portion 9, the lower magnetic layer 12 and the upper read shield layer portion 9 are ferromagnetically coupled to each other. In this case, a magnetic adverse influence of the extreme high saturation magnetic flux density of the lower magnetic layer 12 is exerted on the upper read shield layer portion 9, so that the magnetic domain structure of the upper read shield layer portion 9 tends to unintentionally change, more concretely, tends to be out of an ideal magnetization state where the MR element 6 can be normally operated by being magnetically shielded from the periphery. When the magnetic domain structure of the upper read shield layer portion 9 unintentionally changes, the strength of a bias magnetic field supplied to the MR element 6 changes. Therefore, the MR element 6 is easily influenced by magnetic noise (so-called write induce noise). Due to this, the reproduction output of the MR element 6 becomes unstable, so that the reproduction performance deteriorates.

Consequently, in the thin film magnetic head of the comparative example, the recording performance is assured whereas the reproduction performance deteriorates, so that it is difficult to satisfy both assurance of the recording performance and assurance of the reproduction performance.

In contrast, in the thin film magnetic head according to the embodiment of the invention (refer to FIG. 2), both of the lower magnetic layer 12 and the main upper pole tip layer 15 have the extremely high saturation magnetic flux density of about 2.4 T or higher in a manner similar to the thin film magnetic head of the comparative example (refer to FIG. 16). Accordingly, the strength of the recording magnetic field increases, thereby assuring the recording performance.

Moreover, in the thin film magnetic head of the embodiment, in the case where the lower magnetic layer 12 has the extremely high saturation magnetic flux density of about 2.4 T or higher, the lower magnetic layer 12 is isolated from the upper read shield layer portion 9 via the head isolation layer 11. Therefore, the lower magnetic layer 12 and the upper read shield layer portion 9 are magnetostatically coupled to each other via the head isolation layer 11. In particular, the head isolation layer 11 is made of ruthenium having a non-diffusion property, that is, a property that the material is not easily diffused to the lower magnetic layer 12 and the upper read shield layer portion 9 to which the head isolation layer 11 is adjacent. Consequently, ferromagnetic coupling between the lower magnetic layer 12 and the upper read shield layer portion 9 is suppressed significantly. That is, magnetostatic coupling between the lower magnetic layer 12 and the upper read shield layer portion 9 is assured. In this case, in spite that the lower magnetic layer 12 has the extremely high saturation magnetic flux density of about 2.4 T or higher, the magnetic adverse influence of the extremely high saturation magnetic flux density of the lower magnetic layer 12 is not exerted on the upper read shield layer portion 9. Therefore, the magnetic domain structure of the upper read shield layer portion 9 does not easily unintentionally change, more concretely, is easily maintained in an ideal magnetization state where the MR element 6 can be normally operated by being magnetically shielded from the periphery. When the magnetic domain structure of the upper read shield layer portion 9 is maintained, the strength of the bias magnetic field supplied to the MR element 6 is stabilized, so that the MR element 6 is not easily influenced by the magnetic noise. As a result, the reproduction output of the MR element 6 is stabilized, so that the reproduction performance is assured.

Accordingly, in the thin film magnetic head according to the embodiment, the recording performance is assured and, in addition, the reproduction performance is assured. Thus, both assurance of the recording performance and assurance of the reproduction performance can be satisfied.

In addition to the above description, in the method of manufacturing the thin film magnetic head according to the embodiment, in the case where the lower magnetic layer 12 is formed by using an iron cobalt alloy (such as $Fe_{65}Co_{35}$) having the extremely high saturation magnetic flux density of about 2.4 T or higher, the head isolation layer 11 is formed by using ruthenium between the lower magnetic layer 12 and the upper read shield layer portion 9. As compared with the case of manufacturing the thin film magnetic head of the comparative example (refer to FIG. 16), only a simple process for newly forming the head isolation layer 11 is additionally required. Therefore, in the embodiment, only by adding the simple process of forming the head isolation layer 11, as described above, the thin film magnetic head in which both of the recording performance and the reproduction performance are assured is manufactured. Thus, the thin film magnetic head satisfying both assurance of the recording performance and assurance of the reproduction performance can be easily manufactured.

In particular, when the main upper pole tip layer 15 in the upper pole tip layer 40 largely contributing to the strength of the recording magnetic field is made of an iron cobalt alloy having the extremely high saturation magnetic flux density of about 2.4 T or higher, since the recording gap layer 14 as a base layer of the main upper pole tip layer 15 is made of ruthenium in the embodiment, the material (iron cobalt alloy) of the main upper pole tip layer 15 and the material (ruthenium) of the recording gap layer 14 are ideally matched from the viewpoint of soft magnetic properties (material compatibility contributing to soft magnetic properties). More concretely, in the process of manufacturing the thin film magnetic head, ruthenium is deposited so as to form the recording gap layer 14 and, after that, the iron cobalt alloy is deposited on the recording gap layer 14 by using the sputtering method so as to form the main upper pole tip layer 15. In comparison with the case where a non-magnetic material other than ruthenium is deposited to form the recording gap layer 14, magnetic permeability improves in a state where the saturation magnetic flux density (=about 2.4 T) of the main upper pole tip layer 15 is maintained. That is, the emission efficiency of a magnetic flux for recording is improved, so that the strength of the recording magnetic field is increased. Therefore, the embodiment can contribute to the assurance of recording performance also from the viewpoint of material compatibility between the main upper pole tip layer 15 and the recording gap layer 14. In this case, particularly, an overwrite property as a representative of the recording performance, that is, a property of magnetically overwriting information can be improved.

Further, ideal material matching between the iron cobalt alloy and ruthenium from the viewpoint of the soft magnetic properties described above can be obtained not only between the main upper pole tip layer 15 and the recording gap layer 14 but also between the lower magnetic layer 12 (iron cobalt alloy) and the head isolation layer 11 (ruthenium) having similar combination of the materials. Therefore, the embodiment can contribute to assurance of the recording performance also from the viewpoint of material matching of the materials between the lower magnetic layer 12 and the head isolation layer 11. Obviously in this case as well, the embodiment can contribute to improvement in the overwrite property.

When all of the nonmagnetic layer 8, the head isolation layer 11 and the recording gap layer 14 are formed by using ruthenium in the embodiment, the kinds of the materials used in the process of manufacturing the thin film magnetic head decrease. Therefore, the embodiment can contribute to simplification of the manufacture of the thin film magnetic head also from this viewpoint.

The thin film magnetic head according to the embodiment of the invention and the method of manufacturing of the same have been described above.

Figure 17:
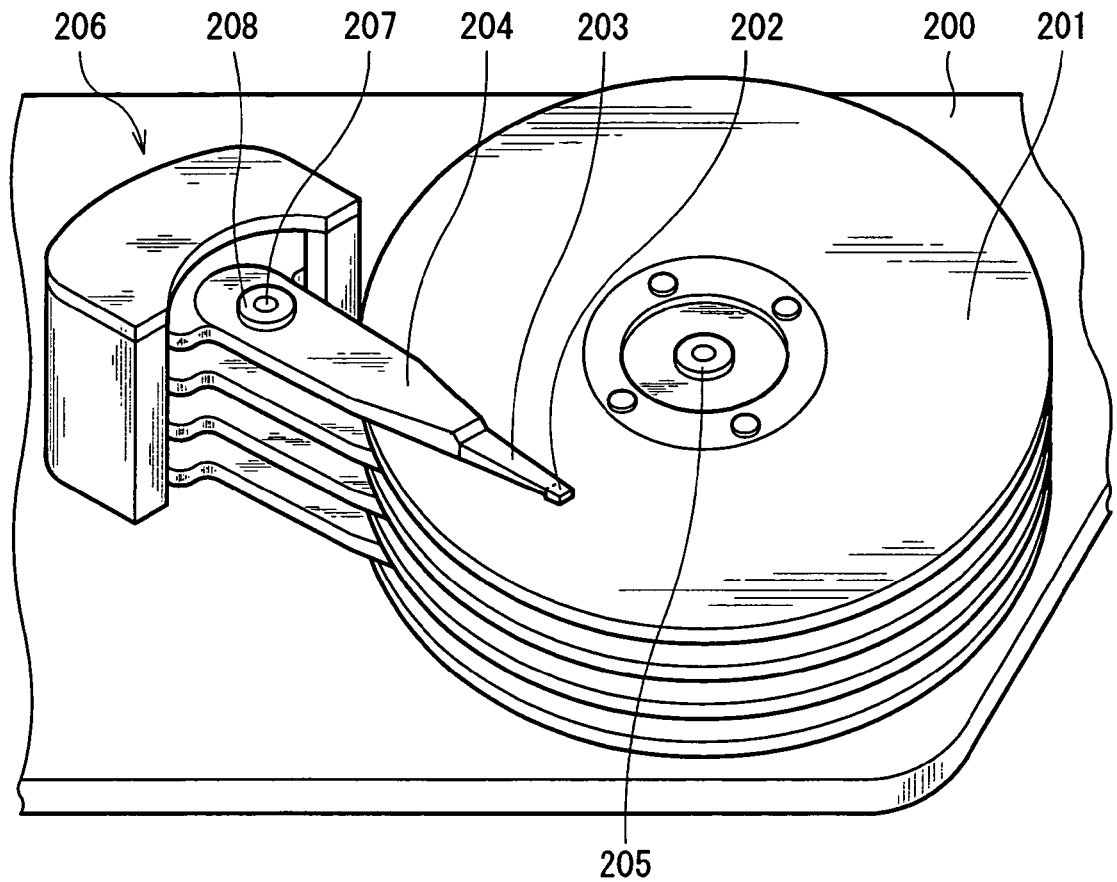
FIG. 17 is a perspective view showing a perspective configuration of the magnetic recording apparatus in which the thin film magnetic head according to the embodiment of the invention is mounted.
Figure 18:
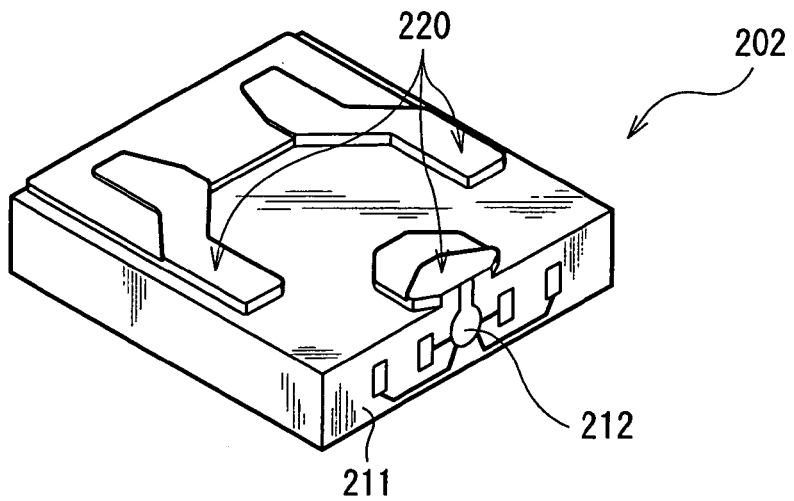
FIG. 18 is an enlarged perspective view showing a perspective configuration of a main portion of the magnetic recording apparatus illustrated in FIG. 17.

Next, referring to FIGS. 17 and 18, the configuration of a magnetic recording apparatus on which the thin film magnetic head of the invention is mounted will be described. FIG. 17 shows a perspective view of the magnetic recording apparatus. FIG. 18 is an enlarged perspective view showing the configuration of a main part of the magnetic recording apparatus. The magnetic recording apparatus is an apparatus on which the thin film magnetic head described in the foregoing embodiment is mounted and is, for example, a hard disk drive.

The magnetic recording apparatus has, as shown in FIG. 17, for example, in a casing 200, a plurality of magnetic disks (such as hard disks) 201 as recording media onto which information is magnetically recorded, a plurality of suspensions 203 disposed in correspondence with the magnetic disks 201 and each supporting a magnetic head slider 202 at its one end, and a plurality of arms 204 supporting the other ends of the suspensions 203. The magnetic disk 201 can rotate around a spindle motor 205 fixed to the casing 200 as a center. Each of the arms 204 is connected to a driving unit 206 as a power source and can swing via a bearing 208 around a fixed shaft 207 fixed to the casing 200 as a center. The driving unit 206 includes a driving source such as a voice coil motor. The magnetic recording apparatus is a model where, for example, a plurality of arms 204 can swing integrally around the fixed shaft 207 as a center. FIG. 17 is a partial cutaway view of the casing 200 so that internal structure of the magnetic recording apparatus can be seen well.

The magnetic head slider 202 has a configuration such that, as shown in FIG. 18, a thin film magnetic head 212 executing both of recording and reproducing processes is attached to one of the faces of a substrate 211 having an almost rectangular parallelepiped shape and made of a nonmagnetic insulating material such as AlTiC. The substrate 211 has, for example, one face (air bearing surface 220) including projections and depressions to decrease air resistance which occurs when the arm 204 swings. The thin film magnetic head 212 is attached to another face (the right front-side face in FIG. 18) orthogonal to the air bearing surface 220. The thin film magnetic head 212 has the configuration described in the foregoing embodiment. When the magnetic disk 201 rotates at the time of recording or reproducing information, the magnetic head slider 202 floats from the recording surface of the magnetic disk 201 by using an air current generated between the recording surface (the surface facing the magnetic head slider 202) of the magnetic disk 201 and the air bearing surface 220. FIG. 18 shows the upside down state of FIG. 17 so that the structure of the air bearing surface 220 of the magnetic head slider 202 can be seen well.

In the magnetic recording apparatus, at the time of recording or reproducing information, by the swing of the arm 204, the magnetic head slider 202 moves to a predetermined area (recording area) in the magnetic disk 201. When current is passed to the thin film magnetic head 212 in a state where the thin film magnetic head 212 faces the magnetic disk 201, the thin film magnetic head 212 operates on the basis of the operation principle described in the foregoing embodiment and performs a recording or reproducing process on the magnetic disk 201.

In the magnetic recording apparatus, the thin film magnetic head 212 described in the foregoing embodiment is mounted. Consequently, as described above, both assurance of recording performance and assurance of reproduction performance can be satisfied.

Since the other configuration, operation, action, and effects except for the above of the thin film magnetic head 212 mounted on the magnetic recording apparatus are similar to those of the foregoing embodiment, their description will not be repeated.

EXAMPLES

Next, examples of the present invention will be described.

By using the method of manufacturing the thin film magnetic head described in the foregoing embodiment (refer to FIGS. 1 to 15), the following series of thin film magnetic heads (examples 1 to 8; refer to FIGS. 1 to 3) were manufactured. Hereinbelow, only configurations (the materials, thickness, and saturation magnetic flux density) of main parts (a head isolation layer, a lower magnetic layer, a recording gap layer, and a main upper pole tip layer) contributing to recording performance and reproduction performance of the thin film magnetic head will be described.

Example 1

A head isolation layer was formed so as to have a thickness of 1 nm by using ruthenium (Ru), a lower magnetic layer was formed by using iron cobalt alloy ($Fe_{65}Co_{35}$) of 24 T, a recording gap layer was formed so as to have a thickness of 100 nm by using ruthenium (Ru), and a main upper pole tip layer was formed by using iron cobalt alloy ($Fe_{65}Co_{35}$) of 2.4 T, thereby manufacturing a thin film magnetic head.

Example 2

A thin film magnetic head was manufactured with parameters similar to the manufacture parameters of the example 1 except for the point that the thickness of the head isolation layer was set to 2 nm.

Example 3

A thin film magnetic head was manufactured with parameters similar to the manufacture parameters of the example 1 except for the point that the thickness of the head isolation layer was set to 5 nm.

Example 4

A thin film magnetic head was manufactured with parameters similar to the manufacture parameters of the example 1 except for the point that the thickness of the head isolation layer was set to 10 nm.

Example 5

A thin film magnetic head was manufactured with parameters similar to the manufacture parameters of the example 4 except for the point that the thickness of the recording gap layer was set to 30 nm.

Example 6

A thin film magnetic head was manufactured with parameters similar to the manufacture parameters of the example 4 except for the point that the thickness of the recording gap layer was set to 150 nm.

Example 7

A thin film magnetic head was manufactured with parameters similar to the manufacture parameters of the example 4 except for the point that the iron cobalt alloy ($Fe_{80}Co_{20}$) of 2.4 T was used as the material of the lower magnetic layer.

Example 8

A thin film magnetic head was manufactured with parameters similar to the manufacture parameters of the example 4 except for the point that the iron cobalt alloy ($Fe_{60}Co_{40}$) of 2.4 T was used as the material of the lower magnetic layer.

At the time of manufacturing the thin film magnetic heads of examples 1 to 8, the following series of thin film magnetic heads (comparative examples 1 to 7) were also manufactured to evaluate the recording performance and reproduction performance of the thin film magnetic heads of the examples 1 to 8 by comparison.

Comparative Example 1

A head isolation layer was not formed but a lower magnetic layer was formed by using cobalt nickel iron alloy ($Co_{65}Ni_{17}Fe_{18}$) of 1.8 T, a recording gap layer was formed so as to have a thickness of 100 nm by using ruthenium (Ru), and a main upper pole tip layer was formed by using iron cobalt alloy ($Fe_{65}Co_{35}$) of 2.4 T, thereby manufacturing a thin film magnetic head.

Comparative Example 2

A thin film magnetic head was manufactured with parameters similar to the manufacture parameters of the comparative example 1 except for the point that the iron cobalt alloy ($Fe_{85}Co_{15}$) of 2.2 T was used as the material of the lower magnetic layer.

Comparative Example 3

A thin film magnetic head was manufactured with parameters similar to the manufacture parameters of the comparative example 1 except for the point that the iron cobalt alloy ($Fe_{65}Co_{35}$) of 2.4 T was used as the material of the lower magnetic layer.

Comparative Example 4

A thin film magnetic head was manufactured with parameters similar to the manufacture parameters of the comparative example 3 except for the point that a head isolation layer was formed to have a thickness of 10 nm by using chromium (Cr).

Comparative Example 5

A thin film magnetic head was manufactured with parameters similar to the manufacture parameters of the comparative example 3 except for the point that a head isolation layer was formed to have a thickness of 0.75 nm by using ruthenium (Ru).

Comparative Example 6

A thin film magnetic head was manufactured with parameters similar to the manufacture parameters of the comparative example 3 except for the point that a head isolation layer was formed to have a thickness of 12 nm by using ruthenium (Ru).

Comparative Example 7

A thin film magnetic head was manufactured with parameters similar to the manufacture parameters of the comparative example 3 except for the point that the head isolation layer was formed so as to have a thickness of 10 nm by using ruthenium (Ru) and the recording gap layer was formed by using alumina ($Al_2O_3$).

The thin film magnetic heads of the examples 1 to 8 and the comparative examples 1 to 7 were mounted on a magnetic recording apparatus (refer to FIGS. 17 and 18), and the recording performance and reproduction performance were examined while executing recording and reproduction processes on a recording medium by using the magnetic recording apparatus.

First, before concretely examining the recording performance and the reproduction performance of the thin film magnetic head, soft magnetic properties of iron cobalt alloy ($Fe_{65}Co_{35}$) having a saturation magnetic flux density of 2.4 T were examined and results shown in Table 1 were obtained. Table 1 shows base dependency of magnetic permeability of the iron cobalt alloy ($Fe_{65}Co_{35}$). At the time of examining the magnetic permeability of the iron cobalt alloy ($Fe_{65}Co_{35}$), ruthenium (Ru) was deposited to form a base layer while changing a thickness T in eight levels (0 nm, 0.75 nm, 1 nm, 2 nm, 10 nm, 100 nm, 150 nm, and 200 nm) by using sputtering method, thereby forming a base layer. Subsequently, an iron cobalt alloy ($Fe_{65}Co_{35}$) layer was deposited on the base layer by using the sputtering method. After that, magnetic permeability $\mu'$ of the iron cobalt alloy ($Fe_{65}Co_{35}$) layer (magnetic permeability at 200 MHz) was measured. At the time of examining the magnetic permeability $\mu'$ of the iron cobalt alloy ($Fe_{65}Co_{35}$) layer formed on the base layer (Ru), to evaluate the magnetic permeability $\mu'$ by comparison, the iron cobalt alloy layer was similarly deposited on the base layer except for the point that the base layer was formed by depositing chromium (Cr) to a thickness of 10 nm by using the sputtering method, and the magnetic permeability $\mu'$ of the iron cobalt alloy layer was similarly measured. Table 1 shows the variations of the materials of the base layer ("Ru" and "Cr") and "thickness T" and, in addition, "magnetic permeability $\mu$" of the iron cobalt alloy layer.

TABLE 1

|    | Thickness T | Magnetic permeability $\mu'$ |
|----|-------------|------------------------------|
| Ru | 0 nm        | 521                          |
|    | 0.75 nm     | 625                          |
|    | 1 nm        | 1452                         |
|    | 2 nm        | 1984                         |
|    | 10 nm       | 1641                         |
|    | 100 nm      | 1621                         |
|    | 150 nm      | 1682                         |
|    | 200 nm      | 1542                         |
| Cr | 10 nm       | 619                          |

As understood from the results shown in Table 1, the magnetic permeability $\mu'$ of the iron cobalt alloy layer gradually increases as the thickness T of the base layer (Ru) increases from 0 nm to 2 nm, after that, decreases as the thickness T increases from 2 nm to 200 nm, and becomes almost constant. That is, a curve having a peak at the thickness T=2 nm is drawn. This indicates that, when the base layer of the iron cobalt alloy ($Fe_{65}Co_{35}$) layer having the saturation magnetic flux density of 2.4 T is formed of ruthenium, the material matching between the iron cobalt alloy and ruthenium is good, so that the magnetic permeability of the iron cobalt alloy becomes extremely high. For reference, the magnetic permeability $\mu'$ of the iron cobalt alloy layer in the case where the thickness T of the base layer (Cr) was set to 10 nm was equal to 619 which is considerably lower than the magnetic permeability $\mu'$ (=1641) of the iron cobalt alloy layer in the case where the thickness T of the base layer (Ru) was set to 10 nm. When the base layer of the iron cobalt alloy ($Fe_{65}Co_{35}$) layer having the saturation magnetic flux density of 2.4 T is made of chromium, grain size of the iron cobalt alloy increases, so that the magnetic permeability $\mu'$ of the iron cobalt alloy layer is not increased. It was therefore confirmed that, by forming the iron cobalt alloy ($Fe_{65}Co_{35}$) layer having the saturation magnetic flux density of 2.4 T on the base layer (Ru), the magnetic permeability of the iron cobalt alloy is extremely increased.

Subsequently, the recording performance and reproduction performance of the thin film magnetic heads were examined and results shown in Tables 2 and 3 were obtained. Tables 2 and 3 show the recording performance and the reproduction performance of the thin film magnetic heads. Table 2 shows results of the thin magnetic heads of the examples 1 to 8. Table 3 shows results of the thin film magnetic heads of the comparative examples 1 to 7. In Tables 2 and 3, an "overwrite property (dB)" is shown as recording performance and "COD (coefficient of difference %)", that is, the coefficient of fluctuation in a reproduction output is shown as reproduction performance. At the time of examining the "COD", an initial signal is recorded and reproduced to and from a predetermined track on a recording medium by using the thin film magnetic head. The thin film magnetic head is moved to another track on the recording medium and is allowed to perform recording operation while setting each of a recording current and a recording frequency to the maximum. After that, the initial signal is reproduced again by using the thin film magnetic head, and the coefficient of difference in the reproduction output was examined. In order to easily grasp the configuration differences among the magnetic heads of the examples 1 to 8 and the comparative examples 1 to 7, the material, thickness, and saturation magnetic flux density of each of "head isolation layers", "lower magnetic layers", "recording gap layers", and "main upper pole tip layers" are also shown in Tables 2 and 3.

mance is required to be −30 dB or more (hereinbelow, simply called "recording performance criterion") and COD contributing to reproduction performance is required to be 3% or less (hereinbelow, simply called "reproduction performance criterion") as two performance criteria in practical use of the thin film magnetic head, all of the thin film magnetic heads of the examples 1 to 8 meet both of the recording performance criterion and the reproduction performance criterion. That is, the overwrite property was equal to −30 dB or more and the COD was equal to 3% or less. On the other hand, all of the thin film magnetic heads of the comparative examples 1 to 7 do not meet both of the recording performance criterion and the reproduction performance criterion. That is, the overwrite property was less than −30 dB or the COD was more than 3%.

The results shown in Tables 2 and 3 were analyzed in detail and the following series of results were obtained.

First, the recording performance and the reproduction performance in the comparative examples 1 to 3 were compared. The overwrite property increases from −24 dB to −28 dB as

TABLE 2

|  | Head isolation layer (thickness) | Lower magnetic layer (saturation magnetic flux density) | Recording gap layer (thickness) | Main upper pole tip layer (saturation magnetic flux density) | Overwrite property | COD |
| --- | --- | --- | --- | --- | --- | --- |
| Example 1 | Ru (1 nm) | $Fe_{65}Co_{35}$ (2.4 T) | Ru (100 nm) | $Fe_{65}Co_{35}$ (2.4 T) | −32 dB | 2.5% |
| Example 2 | Ru (2 nm) | $Fe_{65}Co_{35}$ (2.4 T) | Ru (100 nm) | $Fe_{65}Co_{35}$ (2.4 T) | −35 dB | 2% |
| Example 3 | Ru (5 nm) | $Fe_{65}Co_{35}$ (2.4 T) | Ru (100 nm) | $Fe_{65}Co_{35}$ (2.4 T) | −37 dB | 2% |
| Example 4 | Ru (10 nm) | $Fe_{65}Co_{35}$ (2.4 T) | Ru (100 nm) | $Fe_{65}Co_{35}$ (2.4 T) | −36 dB | 1% |
| Example 5 | Ru (10 nm) | $Fe_{65}Co_{35}$ (2.4 T) | Ru (30 nm) | $Fe_{65}Co_{35}$ (2.4 T) | −30 dB | 0% |
| Example 6 | Ru (10 nm) | $Fe_{65}Co_{35}$ (2.4 T) | Ru (150 nm) | $Fe_{65}Co_{35}$ (2.4 T) | −40 dB | 1% |
| Example 7 | Ru (10 nm) | $Fe_{80}Co_{20}$ (2.4 T) | Ru (100 nm) | $Fe_{65}Co_{35}$ (2.4 T) | −31 dB | 1% |
| Example 8 | Ru (10 nm) | $Fe_{60}Co_{40}$ (2.4 T) | Ru (100 nm) | $Fe_{65}Co_{35}$ (2.4 T) | −35 dB | 1% |

TABLE 3

|  | Head isolation layer (thickness) | Lower magnetic layer (saturation magnetic flux density) | Recording gap layer (thickness) | Main upper pole tip layer (saturation magnetic flux density) | Overwrite property | COD |
| --- | --- | --- | --- | --- | --- | --- |
| Comparative example 1 | — | $Co_{65}Ni_{17}Fe_{18}$ (1.8 T) | Ru (100 nm) | $Fe_{65}Co_{35}$ (2.4 T) | −24 dB | 1% |
| Comparative example 2 | — | $Fe_{85}Co_{15}$ (2.2 T) | Ru (100 nm) | $Fe_{65}Co_{35}$ (2.4 T) | −28 dB | 2% |
| Comparative example 3 | — | $Fe_{65}Co_{35}$ (2.4 T) | Ru (100 nm) | $Fe_{65}Co_{35}$ (2.4 T) | −28 dB | 12% |
| Comparative example 4 | Cr (10 nm) | $Fe_{65}Co_{35}$ (2.4 T) | Ru (100 nm) | $Fe_{65}Co_{35}$ (2.4 T) | −28 dB | 3% |
| Comparative example 5 | Ru (0.75 nm) | $Fe_{65}Co_{35}$ (2.4 T) | Ru (100 nm) | $Fe_{65}Co_{35}$ (2.4 T) | −29 dB | 9% |
| Comparative example 6 | Ru (12 nm) | $Fe_{65}Co_{35}$ (2.4 T) | Ru (100 nm) | $Fe_{65}Co_{35}$ (2.4 T) | −28 dB | 0% |
| Comparative example 7 | Ru (10 nm) | $Fe_{65}Co_{35}$ (2.4 T) | $Al_2O_3$ (100 nm) | $Fe_{65}Co_{35}$ (2.4 T) | −27 dB | 1% |

As understood from the results shown in Tables 2 and 3, when the overwrite property contributing to recording perforthe saturation magnetic flux density of the lower magnetic layer increases from 1.8 T to 2.4 T. However, the overwrite property of any of the comparative examples 1 to 3 does not meet the recording performance criterion. Further, the COD increases from 1% to 12% as the saturation magnetic flux density of the lower magnetic layer increases from 1.8 T to 2.4 T. That is, the reproduction performance criterion is met in the comparative examples 1 and 2 but it was not met in the comparative example 3. It was consequently confirmed that the overwrite property tends to improve when the saturation magnetic flux density of the lower magnetic layer increases. Further, in the case where the head isolation layer is not provided between the lower magnetic layer and the upper read shield layer portion, a tendency was recognized such that the reproduction output largely fluctuates when the saturation magnetic flux density of the lower magnetic layer increases to 2.4 T Second, the recording performance and the reproduction performance in the examples 1 to 4 were compared with those of the comparative example 3. In the comparative example 3, as described above, the overwrite property does not meet the recording performance criterion, and the COD does not meet the reproduction performance criterion. On the other hand, in the examples 1 to 4, the overwrite property meets the recording performance criterion and the COD also meets the reproduction performance criterion. It was consequently confirmed that, in the thin film magnetic head of the invention (the examples 1 to 4), by providing the head isolation layer between the lower magnetic layer and the upper read shield layer portion, even when the saturation magnetic density of the lower magnetic layer increases to 2.4 T, fluctuations in the reproduction output can be suppressed.

In the case, particularly, the recording performances of the example 4 and the comparative example 3 having a common configuration with respect to the point that the lower magnetic layer is formed of the iron cobalt alloy ($Fe_{65}Co_{35}$) having the saturation magnetic flux density of 2.4 T are compared with each other. The overwrite property of the comparative example 3 is –28 dB and does not meet the recording performance criterion. On the other hand, the overwrite property of the example 4 is equal to –36 dB and meets the recording performance criterion. It was consequently confirmed that, in the thin film magnetic head of the invention (the example 4), when the head isolation layer is formed of ruthenium in the case where the lower magnetic layer is formed of the iron cobalt alloy ($Fe_{65}Co_{35}$) having the saturation magnetic flux density of 2.4 T, the material matching of the materials is good, so that the magnetic permeability of the lower magnetic layer increases and the overwrite property improves remarkably.

The recording performance of the comparative example 4 was examined for reference. When the head isolation layer is formed of chromium in the case where the lower magnetic layer is formed of the iron cobalt alloy ($Fe_{65}Co_{35}$) having the saturation magnetic flux density of 2.4 T, the COD is equal to 3% and meets the reproduction performance criterion. However, the overwrite property is equal to –28 dB and does not meet the recording performance criterion. This indicates that, when the head isolation layer is formed of chromium, good material matching is not obtained between the iron cobalt alloy and ruthenium as described in the example 4, so that the magnetic permeability of the lower magnetic layer does not increase. Thus, it was confirmed that there is good material matching between the iron cobalt alloy and ruthenium in the lower magnetic layer and the head isolation layer.

Third, the recording performance and reproduction performance were compared among the examples 1 to 4 and the comparative examples 5 and 6 having a common configuration with respect to the point that the lower magnetic layer is formed of the iron cobalt alloy ($Fe_{65}Co_{35}$) having the saturation magnetic flux density of 2.4 T and the head isolation layer is formed of ruthenium. In the comparative example 5 in which the thickness of the head isolation layer is 0.75 nm, the overwrite property is equal to –29 dB and does not meet the recording performance criterion and, in addition, the COD is 9% and does not meet the reproduction performance criterion. It shows that, when the head isolation layer is too thin, the effect of good material matching between the iron cobalt alloy and ruthenium is decreased. Therefore, the magnetic permeability of the lower magnetic layer is not sufficiently increased and the lower magnetic layer and the upper read shield layer portion tend to be ferromagnetically coupled to each other. Accordingly, the reproduction output tends to fluctuate. In the examples 1 to 4 in which the thicknesses of the head isolation layer is 1 nm, 2 nm, 5 nm, and 10 nm, respectively, as described above, the overwrite property meets the recording performance criterion and the COD also meets the reproduction performance criterion. Further, in the comparative example 6 in which the thickness of the head isolation layer is 12 nm, the overwrite property is equal to –28 dB and does not meet the recording performance criterion. On the other hand, the COD is equal to 0% and meets the reproduction performance criterion. This shows that when the head isolation layer is too thick, a magnetic flux for recording is leaked due to the fact that the head isolation layer functions as a magnetic gap. Therefore, the strength of a recording magnetic field decreases and the lower magnetic layer and the upper read shield layer portion are magnetostatically coupled to each other. Accordingly, the reproduction output does not easily fluctuate. It was consequently confirmed that, in the thin film magnetic heads of the invention (the examples 1 to 4), by setting the thickness of the head isolation layer in a range of 1 nm to 10 nm, the overwrite property meets the recording performance criterion, and the COD meets the reproduction performance criterion. The range of proper thickness of the head isolation layer (from 1 nm to 10 nm) almost matches with the range in which the magnetic permeability $\mu'$ of the iron cobalt alloy ($Fe_{65}Co_{35}$) layer shown in Table 1 reaches its peak.

Fourth, the recording performance and reproduction performance in the examples 4 to 6 having a common configuration with respect to the point that the lower magnetic layer is formed of the iron cobalt alloy ($Fe_{65}Co_{35}$) having the saturation magnetic flux density of 2.4 T and the head isolation layer is formed of ruthenium were examined. Also in the examples 5 and 6 in which the thicknesses of the recording gap layer is 30 nm and 150 nm, respectively, the overwrite property meets the recording performance criterion and the COD meets the reproduction performance criterion in a manner similar to the example 4 in which the thickness of recording gap layer is 100 nm. More concretely, the overwrite property and the COD are equal to –36 dB and 1%, respectively, in the example 4, –30 dB and 0%, respectively, in the example 5, and –40 dB and 1%, respectively, in the example 6. It was consequently confirmed that, in the thin film magnetic head of the invention (the examples 4 to 6), by setting the thickness of the recording gap layer in a range from 30 nm to 150 nm, the overwrite property meets the recording performance criterion, and the COD meets the reproduction performance criterion.

Fifth, the recording performance and the reproduction performance in the examples 4, 7, and 8 having a common configuration except for the point that the materials of the lower magnetic layers are different to each other were examined. Also in the examples 7 and 8 in which the materials of the lower magnetic layers are the iron cobalt alloys ($Fe_{80}Co_{20}$ and $Fe_{60}Co_{40}$), the overwrite property meets the recording performance criterion and the COD meets the reproduction performance in a manner similar to the example 4 in which the material of the lower magnetic layer is the iron cobalt alloy ($Fe_{65}Co_{35}$). More concretely, the overwrite property and the COD are −36 dB and 1%, respectively, in the example 4, −31 dB and 1%, respectively, in the example 7, and −35 dB and 1%, respectively, in the example 8. It was consequently confirmed that, in the thin film magnetic head of the invention (the examples 4, 7, and 8), by setting the content of iron in the iron cobalt alloy as the material of the lower magnetic layer to 60 to 80 at %, the overwrite property meets the recording performance criterion, and the COD meets the reproduction performance criterion.

Sixth, for reference, the recording performance and the reproduction performance of the comparative example 7 in which the recording gap layer is formed of alumina as a typical gap material were examined. Although the overwrite property is equal to −27 dB and does not meet the recording performance criterion, the COD is 1% and meets the reproduction performance criterion. This shows that, when the recording gap layer is formed of alumina, good material matching between the iron cobalt alloy and ruthenium described in the example 4 cannot be obtained between the main upper pole tip layer and the recording gap layer, and the magnetic permeability of the main upper pole tip layer does not increase. It is clear that the magnetic permeability of the main upper pole tip layer increases when the material matching between the material of the main upper pole tip layer and the material of the recording gap layer is good in the case where the recording gap layer is made of ruthenium since the overwrite property meets the recording performance criterion in the example 4 having a configuration similar to that of the comparative example 7 except for the point that the recording gap layer is formed of ruthenium. It was consequently confirmed that the iron cobalt alloy and ruthenium have good material matching between the main upper pole tip layer and the recording gap layer in a manner similar to the combination of the lower magnetic layer and the head isolation layer.

Although the present invention has been described above by the embodiment and the examples, the invention is not limited to the foregoing embodiment and examples but can be variously modified. Concretely, for example, the configurations of the thin film magnetic head and the magnetic recording apparatus and the procedure of the method of manufacturing the thin film magnetic head which have been described in the foregoing embodiment and examples are not always limited to the above-described configurations and the procedure. The invention can be freely modified as long as both assurance of recording performance and assurance of reproduction performance can be satisfied by providing the head isolation layer 11 formed of ruthenium between the lower magnetic layer 12 and the upper read shield layer portion 9 in the case where the lower magnetic layer 12 is formed of the iron cobalt alloy having extremely high saturation magnetic density of 2.4 T or higher.

Figure 19:
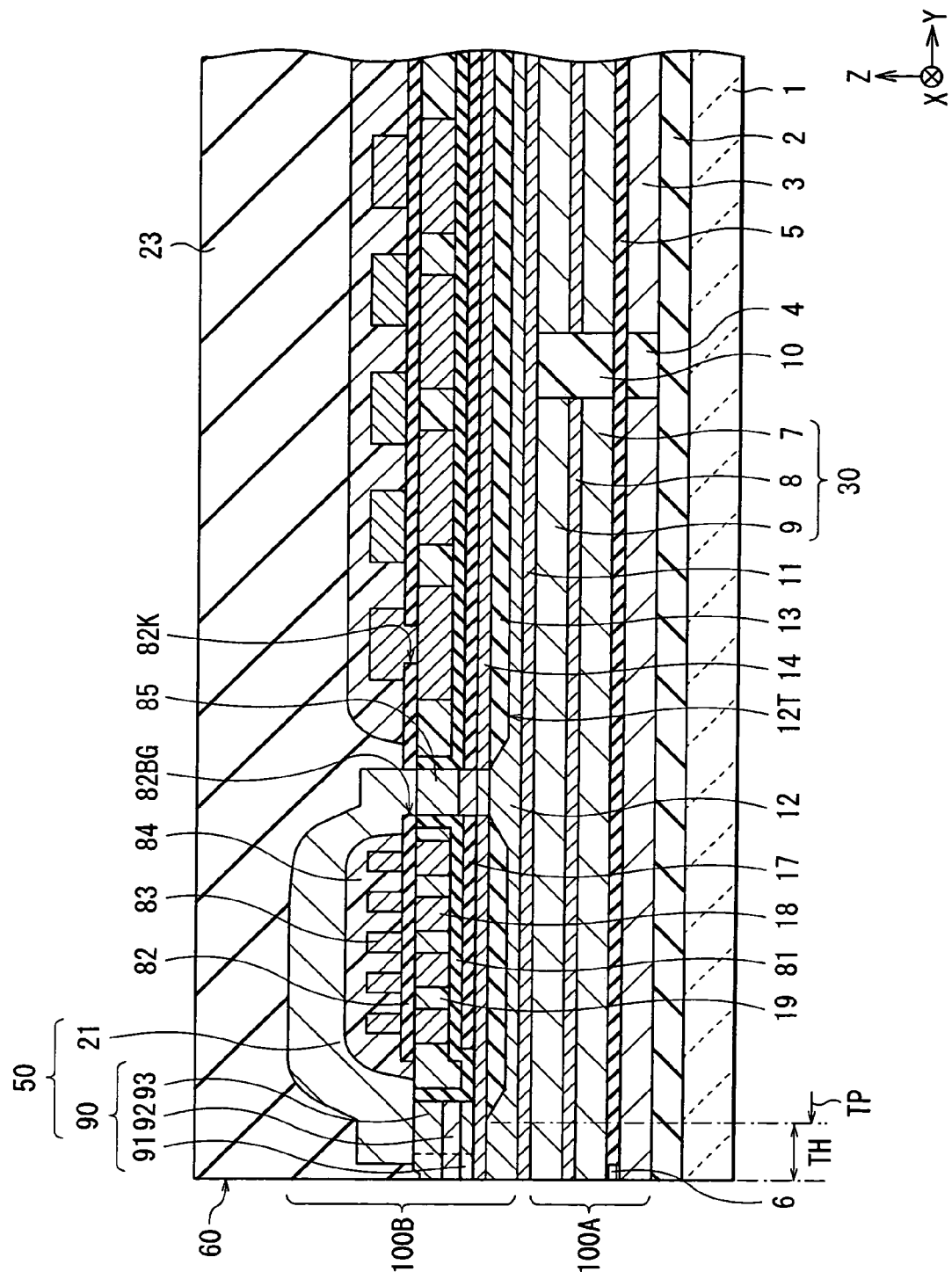
FIG. 19 is a cross section showing a sectional configuration (sectional configuration along a YZ plane) of a modification of the configuration of the thin film magnetic head according to the embodiment of the invention.
Figure 20:
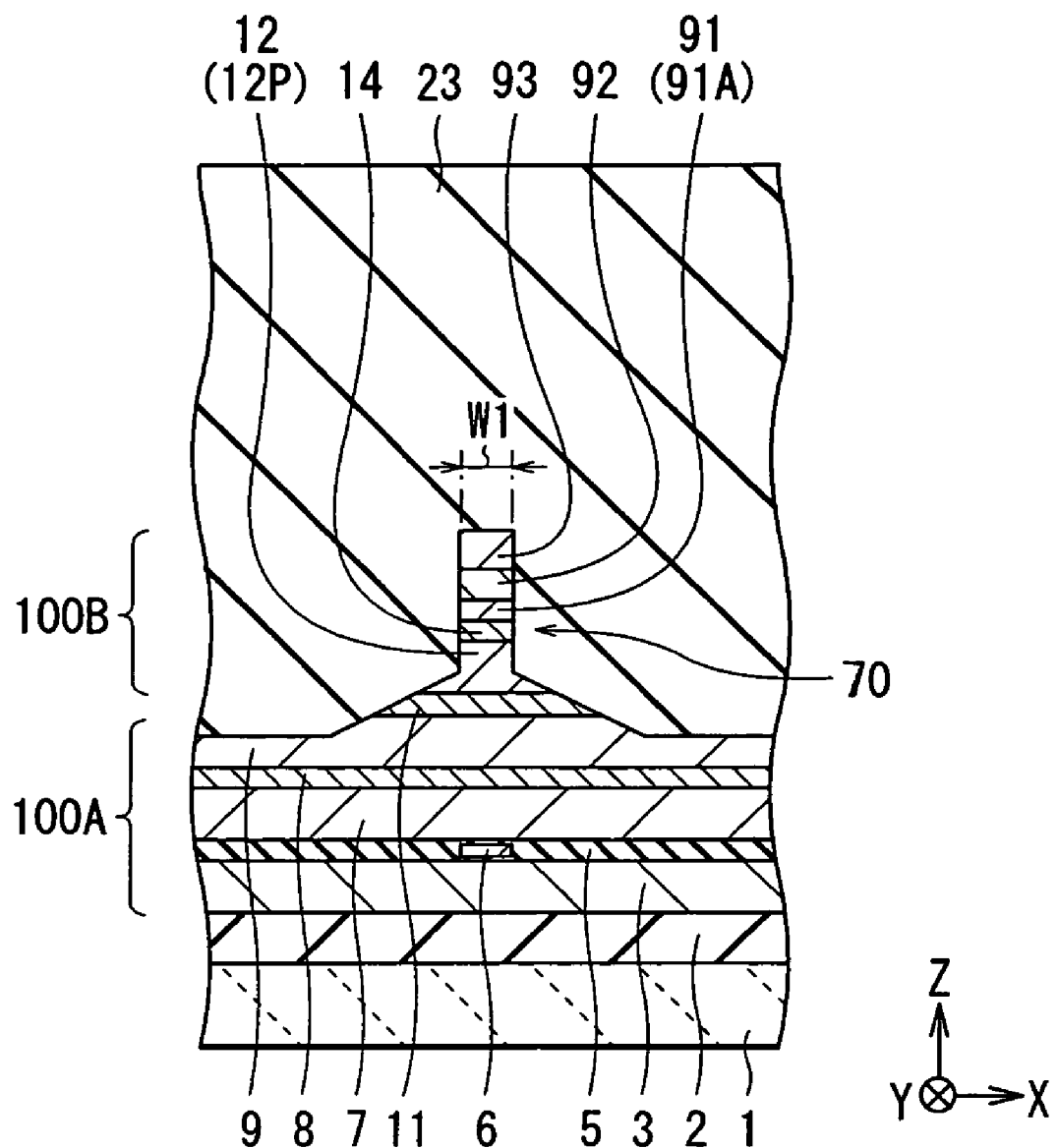
FIG. 20 is a cross section showing a sectional configuration (sectional configuration along an XZ plane) of the thin film magnetic head illustrated in FIG. 19.

As an example of a modification of the configuration of the thin film magnetic head, the thin film magnetic head may be formed as shown in FIGS. 19 and 20 corresponding to FIGS. 1 and 2, respectively. In FIGS. 19 and 20, the same reference numerals are designated to the same components as those shown in FIG. 1. The thin film magnetic head shown in FIGS. 19 and 20 has a configuration similar to that of the thin film magnetic head shown in FIGS. 1 and 2 except for the following points.

First, the recess 12T is provided not only in front of a back gap 82BG corresponding to the back gap 20BG but also on the rear side of the back gap 82BG in the lower magnetic layer 12. The TH specifying layer 13 is filled in the recess 12T. Second, in replace of the upper pole tip layer 40 having the two-layer structure, an upper pole tip layer 90 is provided having a stacked structure (three-layer structure) in which a main upper pole tip layer 91, an auxiliary upper pole tip layer 92, and an additional upper pole tip layer 93 are stacked in order. The main upper pole tip layer 91 is formed of a material similar to that of the main upper pole tip layer 15 and includes a front end portion 91A corresponding to the front end portion 15A. The auxiliary upper pole tip layer 92 is formed of a material similar to that of the auxiliary upper pole tip layer 16. The additional upper pole tip layer 93 is formed of a magnetic material such as iron nickel alloy ($Fe_{85}Ni_{15}$) and has a step so that the thickness is smaller on the side close to the air bearing surface 60 than that on the close side. Third, the coil insulating layer 17 is provided so as to cover only a lower portion (the top face of the recording gap layer 14) of the space in which the thin film coil 18 is buried. The side of the space (the rear face of the upper pole tip layer 90) and the coil insulating layer 17 are covered with the coil insulating layer 81. Particularly, the surfaces of the upper pole tip layer 90, the thin film coil 18 and the coil insulating layers 19 and 81 are planarized. Fourth, not only the thin film coil 18 in the first stage but also a thin film coil 83 in the second stage having a spiral structure similar to that of the thin film coil 18 are provided. The thin film coil 83 is buried by a coil insulating layer 82 provided on the planarized surface and a coil insulating layer 84 which is provided in the spaces between turns of the thin film coil 83 and the periphery of the thin film coil 83. The number of turns of the thin film coil 83 (for example, five) is set to be larger than that of the thin film coil 18 (for example, four). Fifth, the lower magnetic layer 12 is exposed in the back gap 82 BG and a coupling layer 85 which is formed in the same process as the upper pole tip layer 90 (the main upper pole tip layer 91, the auxiliary upper pole tip layer 92, and the additional upper pole tip layer 93) and has a three-layer structure like the upper pole tip layer 90 is filled in the back gap 82BG. Sixth, the yoke layer 21 extends rearward from the upper pole tip layer 90 through the coil insulating layer 84 to the back gap 82BG on the rear side. The yoke layer 21 in the front portion is magnetically coupled to the upper pole tip layer 90. The yoke layer 21 in the rear portion is magnetically coupled to the lower magnetic layer 12 via the coupling layer 85. Seventh, although the coil wiring layer 22 is not provided, the inner termination end of the thin film coil 83 is electrically connected to the inner termination end of the thin film coil 18 through an opening 82K formed in the coil insulating layer 82.

Also in the thin film magnetic head shown in FIGS. 19 and 20, the head isolation layer 11 formed of ruthenium is provided between the lower magnetic layer 12 and the upper read shield layer portion 9 in the case where the lower magnetic layer 12 is formed of the iron cobalt alloy having extremely high saturation magnetic flux density of 2.4 T or higher. Therefore, both assurance of the recording performance and assurance of the reproduction performance can be satisfied by the effects similar to those of the thin film magnetic head described in the foregoing embodiment (FIGS. 1 and 2).

The thin film magnetic head, the method of manufacturing the same, and the magnetic recording apparatus according to the invention can be applied to a thin film magnetic head in a longitudinal recording method, a method of manufacturing the same, and a magnetic recording apparatus on which the thin film magnetic head in the longitudinal recording method is mounted.

What is claimed is:

1. A thin film magnetic head comprising:

a first magnetic pole and a second magnetic pole which are adjacent to a gap layer, face each other, and generate a magnetic field for magnetizing a recording medium along the surface of the recording medium;

a magnetic shield layer for magnetically shielding a magnetic transducer for converting a magnetic signal to an electric signal from the periphery; and a magnetic isolation layer disposed between the first magnetic pole and the magnetic shield layer so as to be adjacent to the first magnetic pole and the magnetic shield layer, and magnetically isolating between the first pole and the magnetic shield layer, wherein the first magnetic pole is made of an iron cobalt alloy (FeCo) containing iron (Fe) in a range of 60 at % to 80 at % and having saturation magnetic flux density of 2.4 T (tesla) or higher, and the magnetic isolation layer is made of ruthenium (Ru).

2. The thin film magnetic head according to claim 1, wherein the thickness of the magnetic isolation layer lies in the range from 1 nm to 10 nm.

3. The thin film magnetic head according to claim 1, wherein the thickness of the first magnetic pole lies in the range from 100 nm to 500 nm.

4. The thin film magnetic head according to claim 1, wherein the gap layer is made of ruthenium (Ru), and the second magnetic pole is made of an iron cobalt alloy (FeCo) containing iron (Fe) in a range of 60 at % to 80 at % and having saturation magnetic flux density of 2.4 T (tesla) or higher.

5. The thin film magnetic head according to claim 4, wherein the thickness of the gap layer lies in the range from 30 nm to 150 nm, and the thickness of the second magnetic pole lies in the range from 10 nm to 100 nm.

6. A method of manufacturing a thin film magnetic head that generates a magnetic field for magnetizing a recording medium along the surface of the recording medium, comprising:

a first step of forming a magnetic shield layer so as to magnetically shield a magnetic transducer for converting a magnetic signal to an electric signal from the periphery;

a second step of forming a magnetic isolation layer by using ruthenium (Ru) on the magnetic shield layer;

a third step of forming a first magnetic pole on the magnetic isolation layer by using an iron cobalt alloy (FeCo) containing iron (Fe) in a range of 60 at % to 80 at % and having saturation magnetic flux density of 2.4 T (tesla) or higher, thereby magnetically isolating the magnetic shield layer and the first magnetic pole from each other via the magnetic isolation layer;

a fourth step of forming a gap layer on the first magnetic pole; and a fifth step of forming a second magnetic pole on the gap layer so that the first and second magnetic poles are opposed to each other via the gap layer.

7. The method of manufacturing a thin film magnetic head according to claim 6, wherein the steps of forming the first magnetic pole, the gap layer, and the second magnetic pole include:

a step of forming a magnetic layer for forming the first magnetic pole on the magnetic isolation layer by sputtering;

a step of forming the gap layer so as to cover the magnetic layer;

a step of forming the second magnetic pole on the gap layer; and a step of forming the first magnetic pole by continuously etching at least the gap layer and the magnetic layer while using the second magnetic pole as a mask to perform patterning.

8. A magnetic recording apparatus on which a recording medium and a thin film magnetic head for performing a magnetic process on the recording medium are mounted, wherein the thin film magnetic head comprises:

a first magnetic pole and a second magnetic pole which are adjacent to a gap layer, face each other, and generate a magnetic field for magnetizing the recording medium along the surface of the recording medium;

a magnetic shield layer for magnetically shielding a magnetic transducer for converting a magnetic signal to an electric signal from the periphery; and a magnetic isolation layer disposed between the first magnetic pole and the magnetic shield layer so as to be adjacent to the first magnetic pole and the magnetic shield layer, and magnetically isolating between the first pole and the magnetic shield layer, the first magnetic pole is made of an iron cobalt alloy (FeCo) containing iron (Fe) in a range of 60 at % to 80 at % and having saturation magnetic flux density of 2.4 T (tesla) or higher, and the magnetic isolation layer is made of ruthenium (Ru).

* * * * *